(12) United States Patent
Sirois et al.

(10) Patent No.: US 10,794,864 B2
(45) Date of Patent: Oct. 6, 2020

(54) EDDY CURRENT ARRAY PROBE WITH INDEPENDENT TRANSMITTERS

(71) Applicant: EddyFI NDT Inc., Quèbec (CA)

(72) Inventors: Michäel Sirois, Quèbec (CA); Stèfan Parmentier, Quèbec (CA); Marc Grenier, Quèbec (CA); Nathan Decourcelle, Blyes (FR)

(73) Assignee: EDDYFI NDT INC., Quèbec (CA)

( * ) Notice: Subject to any disclaimer, the term of this patent is extended or adjusted under 35 U.S.C. 154(b) by 609 days.

(21) Appl. No.: 15/303,292

(22) PCT Filed: Apr. 14, 2015

(86) PCT No.: PCT/IB2015/052722
§ 371 (c)(1),
(2) Date: Oct. 11, 2016

(87) PCT Pub. No.: WO2015/159226
PCT Pub. Date: Oct. 22, 2015

(65) Prior Publication Data
US 2017/0030862 A1    Feb. 2, 2017

Related U.S. Application Data

(60) Provisional application No. 61/979,352, filed on Apr. 14, 2014.

(51) Int. Cl.
*G01N 27/90*    (2006.01)
(52) U.S. Cl.
CPC ......... *G01N 27/904* (2013.01); *G01N 27/902* (2013.01); *G01N 27/9033* (2013.01)

(58) Field of Classification Search
CPC . G01N 27/902; G01N 27/904; G01N 27/9033
(Continued)

(56) References Cited

U.S. PATENT DOCUMENTS

| 4,409,549 A | 10/1983 | Garner et al. |
| 5,399,968 A | 3/1995 | Sheppard et al. |

(Continued)

FOREIGN PATENT DOCUMENTS

| GB | 2286678 A | 8/1995 |
| WO | 2013190504 A1 | 12/2013 |

OTHER PUBLICATIONS

Garcia-Martin et al., Non-Destructive Techniques Based on Eddy Current Testing, Sensors, 2011, pp. 2525-2565, vol. 11, Open Access, Switzerland.

*Primary Examiner* — Reena Aurora
(74) *Attorney, Agent, or Firm* — Dawn-Marie Bey; Bey & Cotropia PLLC

(57) ABSTRACT

There is described an eddy current array probe for detection and depth sizing of a surface-breaking defect in a metallic material, said eddy current array probe comprising: a probe body comprising a plurality of probe elements arranged in a linear configuration, the probe elements each comprising at least one coil, the probe body being adapted to be displaced along a surface of the metallic material so that a longitudinal axis of the coil be parallel to the surface of the metallic material, the coil, when in use, being adapted to induce an eddy current within the metallic material detect the eddy current; and a set of active elements of the plurality of probe elements being adapted to be selectively operated at a plurality of time-spaced instances.

29 Claims, 12 Drawing Sheets

(58) Field of Classification Search
USPC .......................................................... 324/242
See application file for complete search history.

(56) References Cited

U.S. PATENT DOCUMENTS

| | | |
|---|---|---|
| 5,510,709 A | 4/1996 | Hurley et al. |
| 6,414,483 B1 | 7/2002 | Nath et al. |
| 6,538,435 B2 | 3/2003 | Crouzen et al. |
| 6,636,037 B1 | 10/2003 | Ou-Yang |
| 6,707,296 B2 * | 3/2004 | Looijer ................ G01N 27/902 |
| | | 324/240 |
| 7,528,599 B2 * | 5/2009 | Zimmerman ...... G01N 27/9033 |
| | | 324/220 |

* cited by examiner

EDDY CURRENT ARRAY PROBE WITH INDEPENDENT TRANSMITTERS

TECHNICAL FIELD

The present invention relates to nondestructive testing, and particularly to high-resolution Eddy Current Array (ECA) probes for the detection and sizing of surface-breaking defects in metals.

BACKGROUND OF THE ART

Nondestructive Testing (NDT) is a discipline which aims at evaluating the integrity and/or physical properties of materials without permanently altering the article being inspected. There are numerous NDT methods. Electromagnetic Testing (ET) techniques essentially induce electric currents and/or magnetic fields inside the article being inspected, and assess its integrity and/or physical properties based on the electromagnetic response obtained.

One particular application of ET techniques relates to surface-breaking defects occurring in metallic objects. Detecting and/or characterizing surface defects such as cracks is paramount in a number of industries, and across a variety of applications such as weld verification or condition monitoring of pipelines or pressure vessels.

One of the most common ET techniques is referred to as Eddy Current Testing (ECT) and a probe using this technique is referred to as an ECT probe or a "Weld Probe". An ECT probe usually comprises a small active area in the order of a few square millimeters. Due to its small active area, an ECT probe usually has to be manipulated with precision when a large region of interest needs to be examined. Raster scanning is typical in order to effectively cover an area such as a weld while using an ECT probe. Therefore, the use of an ECT probe requires dexterity from the operator and is time-consuming if a large area has to be scanned requires sufficient time to cover a large area while scanning just a few square millimeters at a time. Indeed, these probes are often referred to as "pencil probes" for the shape they exhibit.

Furthermore, an ECT probe is usually designed so as to minimize the lift-off signal produced, for example, by a layer of paint or coating laying over the metallic object to be inspected, rather than at quantifying this lift-off. Therefore, information about the layer of paint or coating such as its thickness cannot be measured while using an ECT probe.

Balanced Field Electromagnetic Technique (BFET) probes may also be used to detect defects in a material. However, BFET probes presents similar limitations with respect to ECT probes.

Alternating Current Field Measurement (ACFM) probes have also been developed to detect defects in a material. Some ACFM probes make use of a single, large transmitter, which induces a widespread magnetic field in the material being examined. At least some of the above-described limitations also apply to ACFM probes.

Eddy Current Array (ECA) probes may also be used to detect defects in a material. An ECA probe is composed of several individual coils grouped together in one assembly. ECA probes typically feature several rows of coils that can be excited in sequence (multiplexed) to maximize the coverage, minimize the interference between coils in close proximity (mutual inductance), and maximize the resolution of the probe. Some ECA probes comprise orthogonal coils, which prevents the use of the lift-off signal for characterization of a defect over a non-metallic coating. Other ECA probes comprise pancake coils. However, such ECA probes are usually not suitable for providing quality signals on many common materials such as ferritic steel and in the situation where there is a non-magnetic coating over the material to be inspected.

Therefore, there is a need for an improved eddy current probe.

SUMMARY

According to a broad aspect, there is provided an eddy current array probe for detection and depth sizing of a surface-breaking defect in a metallic material, said eddy current array probe comprising: a probe body comprising a plurality of probe elements arranged in a linear configuration, the probe elements each comprising at least one coil, the probe body being adapted to be displaced along a surface of the metallic material so that a longitudinal axis of the coil be parallel to the surface of the metallic material, the coil, when in use, being adapted to induce an eddy current within the metallic material and detect the eddy current; and a set of active elements of the plurality of probe elements being adapted to be selectively operated at a plurality of time-spaced instances.

In one embodiment, the at least one coil comprises a transmitter coil and a receiver, the transmitter coil, when in use, being adapted to induce an eddy current within the metallic material, and a longitudinal axis of the receiver being substantially orthogonal to the eddy current and substantially parallel to the surface of the metallic material so as to allow the receiver to detect the eddy current.

In one embodiment, the receiver comprises a receiver coil.

In another embodiment, the receiver comprises one of a Hall effect sensor and a magneto-resistance sensor.

In one embodiment, a longitudinal axis of the transmitter coil is parallel to the longitudinal axis of the receiver.

In one embodiment, the transmitter coil and the receiver are concentric.

In one embodiment, the probe elements each further comprise a core extending between two ends, the transmitter coil being mounted on the core and the magnetic field being generated between the two ends of the core.

In one embodiment, the core further comprises two legs each extending from a respective one of the two ends for guiding the magnetic field towards the surface of the metallic material.

In one embodiment, the receiver is mounted on the transmitter coil.

In one embodiment, the probe elements each further comprise a sensing coil for detecting an end of the surface-breaking defect, a longitudinal axis of the sensing coil being orthogonal to the eddy current and the surface of the metallic material.

In one embodiment, for each active element, the respective transmitter coil is activated to generate the magnetic field and/or the respective receiver is activated to detect the eddy current.

In one embodiment, at each one of the time-spaced instances, two following one of said active elements are spaced apart by at least one inactive element of said plurality of probe elements.

In another embodiment, the set of active elements comprises at least one group of at least three adjacent probe elements contained within the plurality of probe elements, the transmitter coil of each one of the at least three adjacent probe elements being activated and the receiver of a central one of at least the three adjacent probes being activated.

In one embodiment, the set of active elements comprises at least two groups of at least three adjacent probes, the at least two groups being spaced apart by at least one inactive probe element of said plurality of probe elements.

In a further embodiment, the set of active elements comprises at least one group of at least three adjacent probes contained within the plurality of probe elements, the receiver of each one of the at least three adjacent probes being activated and the transmitter coil of a central one of at least the three adjacent probes being activated.

In one embodiment, the set of active elements comprises at least two groups of at least three adjacent probes, the at least two groups being spaced apart by at least one inactive probe element of said plurality of probe elements.

In one embodiment, each one of the probe elements is encapsulated in a respective casing having a surface-contacting face adapted to contact the surface of the metallic material.

In one embodiment, each one of the probe elements is adapted to move independently towards and away from the surface to accommodate for geometry variations of the surface of the material.

In one embodiment, the array probe further comprises a frame and a plurality of springs each having a first end secured to the frame and a second frame secured to a respective one of the probe elements.

According to another broad aspect, there is provided a method for scanning a surface of a metallic material using the eddy current array probe, comprising: positioning the eddy current array probe on the surface at a first position; selectively activating the active elements at the plurality of time-spaced instances according to a first activation sequence, thereby generating and measuring a first plurality of eddy currents within the metallic material; moving the eddy current array probe to a second and different position; and selectively activating the active elements at the plurality of time-spaced instances according to a second activation sequence, thereby generating and measuring a second plurality of eddy currents within the metallic material.

In one embodiment, the first and second activation sequences are identical.

In one embodiment, said selectively activating comprises sequentially activating groups of probe elements at different ones of the time-spaced instances, each group of probe elements comprising at least one probe element for which the transmitter coil is activated and the receiver is activated, an identification of the at least one probe element varying from one of the time-spaced instances to another one of the time-spaced instances.

In one embodiment, the at least one probe element comprises at least two probe elements, two following ones of the at least two probe elements being spaced apart by an inactive probe element at each one of the time-spaced instances.

In another embodiment, said selectively activating comprises sequentially activating groups of probe elements at different ones of the time-spaced instances, each group of probe elements comprising at least one set of at least three adjacent probes, the receiver of each one of the at least three adjacent probes being activated and the transmitter coil of a central one of at least the three adjacent probes being activated concurrently with the activation of the receiver.

In one embodiment, the at least one set of at least three adjacent probe elements comprises a first set of at least three probe elements and a second set of at least three probe elements, the first and second sets being spaced apart by at least one inactive probe element at each one of the time-spaced instances.

In a further embodiment, said selectively activating comprises sequentially activating groups of probe elements at different ones of the time-spaced instances, each group of probe elements comprising at least one set of at least three adjacent probes, the transmitter coil of each one of the at least three adjacent probes being activated and the receiver of a central one of at least the three adjacent probes being activated concurrently with the activation of the receiver.

In one embodiment, the at least one set of at least three adjacent probe elements comprises a first set of at least three probe elements and a second set of at least three probe elements, the first and second sets being spaced apart by at least one inactive probe element at each one of the time-spaced instances.

In one embodiment, the metallic material comprises a non-metallic surface coating.

In one embodiment, the step of moving is performed substantially continuously.

SHORT DESCRIPTION OF THE DRAWINGS

Further features and advantages of the present invention will become apparent from the following detailed description, taken in combination with the appended drawings, in which.

Figure 30:
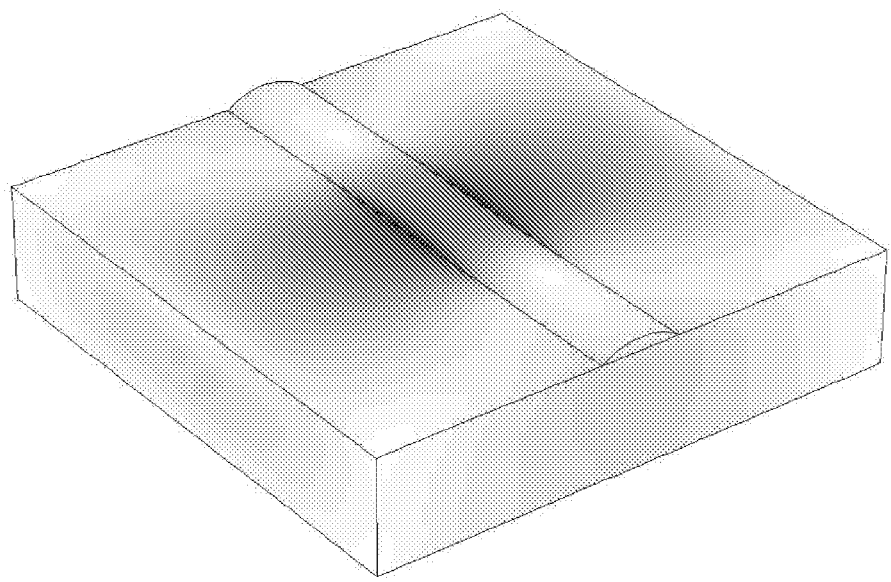
Figure 31:
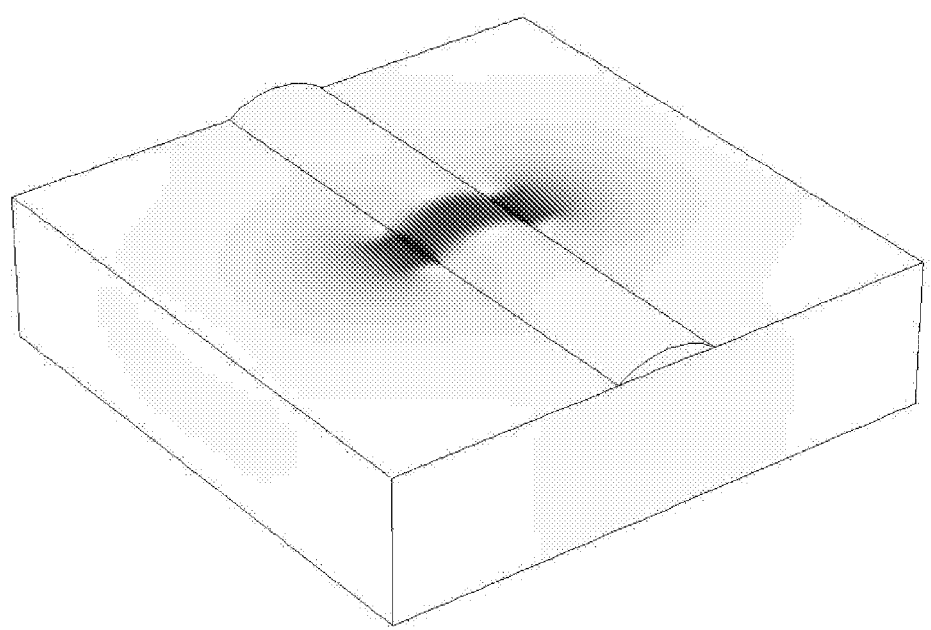

FIG. 30 illustrates a distribution of eddy current density obtained within a material when a single, large transmitter is used to generate a magnetic field within a material to be inspected, in accordance with the prior art; and FIG. 31 illustrates a distribution of eddy current density obtained within the material of FIG. 30 when an array probe comprising five probe elements is used to generate a magnetic field, in accordance with an embodiment.

It will be noted that throughout the appended drawings, like features are identified by like reference numerals.

DETAILED DESCRIPTION

There is described an eddy current array probe having a probe body which includes at least two independent probe elements. Each probe element is composed of at least one coil which acts as an emitter and a receiver. Alternatively, the probe element may comprise at least one transmitter and at least one receiver. The probe elements are arranged in a linear configuration. They are therefore provided side-by-side, along a transversal dimension of the probe body, orthogonal to a scan direction when the eddy current array probe is in use. The probe elements can be longitudinally aligned or misaligned with respect to one another. They can be provided on a single row of coil elements or on a plurality of transversal rows. The rows can be transversally aligned or misaligned within the probe body.

A pair of transmitter-receiver of one probe element is used for the detection and depth sizing of longitudinally oriented surface-breaking defects in a metallic material. In addition to the selected pair, additional individual transmitters and/or receivers from other neighboring elements are also used.

Figure 1:
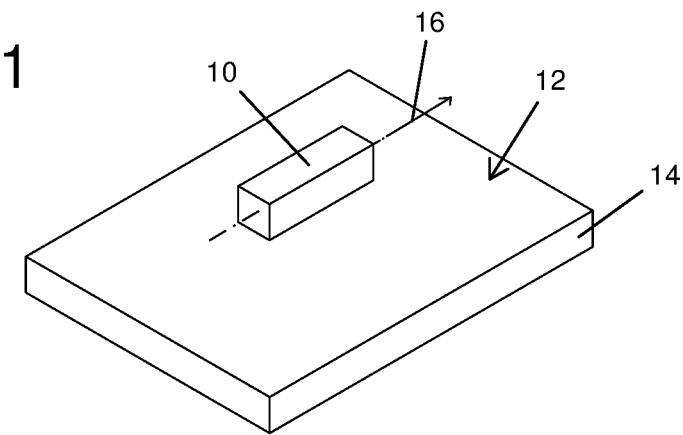
FIG. 1 illustrates a probe element positioned adjacent to a surface to be inspected, in accordance with an embodiment.

FIG. 1 illustrates one embodiment of a probe element 10. The probe element 10 extends along a longitudinal axis and comprises at least one transmitter adapted to generate a magnetic field and a receiver adapted to detect a magnetic field. When in use, the probe element 10 is positioned so as to be substantially parallel to a surface 12 of a piece of metallic material 14 to be inspected, i.e. the longitudinal axis of the probe element 10 is substantially parallel to the surface 12. When in use, the probe element 10 is moved relative to the surface 12 along a scanning direction 16 so that the longitudinal axis of the probe element 10 is parallel to the surface 12 of the material being examined 14 and parallel to the scanning axis 16. If a surface-breaking defect extends in the material to be examined 14 along the scanning direction 16, the probe element 10 will detect the defect and size the depth of the defect.

It should be understood that the probe element 10 may be contained within a probe casing or body. The probe casing comprises a scanning surface which is sized and shaped so as to be placed on the surface 12 of the material to be examined 14 and moved along the surface 12. The position of the probe element 10 within the probe casing is chosen so that the magnetic field generated by the transmitter of the probe element 10 may propagate within the material to be examined 14, thereby inducing an eddy current within the material to be examined 14, and the receiver of the probe element 10 may detect a magnetic field induced by the eddy current within the material 14 when the scanning surface of the casing is positioned on the surface 12 of the material 14.

It should also be understood that the transmitter is electrically connected to a current source such as an alternate current (AC) source. When an AC current having an operation frequency propagates though the transmitter, the transmitter generates a first magnetic field of which a portion penetrates the material to be examined 14. As a result of the first magnetic field generated by the transmitter, eddy currents are induced in the material 14. The eddy currents in turn induce a second magnetic field. The receiver of the probe element 10 is electrically connected to a voltage sensor adapted to measure the induced voltage in the receiver. The receiver is adapted to sense a portion of the magnetic field induced by the eddy current, i.e. the second magnetic field generated by the eddy current induces an electrical voltage within the receiver and the voltage sensor measures the induced voltage at the terminals of the receiver. As a result, when the flow of eddy current induced within the material is modified due to the presence of a surface-breaking defect, the magnetic field induced by the eddy current is modified, which in turn modifies the voltage measured by the voltage sensor. The voltage variations measured at the terminals of the receiver are then indicative of the variations of eddy current deflected by the defect.

Figure 2A:
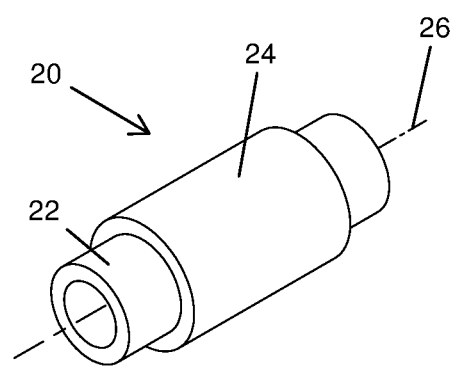
FIG. 2a illustrates a probe element comprising a receiver coil mounted on a transmitter coil, in accordance with an embodiment.

FIG. 2*a* illustrates an exemplary probe element 20 which comprises a transmitter coil 22 and a receiver coil 24. The transmitter coil 22 extends along a longitudinal axis 26 and is provided with given internal and external diameters and a given length along the longitudinal axis 26. The receiver coil 24 also extends along the longitudinal axis 26 so that the transmitter coil 22 and the receiver coil 24 are concentric and coaxial. The receiver coil 24 is provided with given internal and external diameters and a given length along the longitudinal axis 26. The receiver coil 24 is mounted on the transmitter coil 22, i.e. the internal diameter of the receiver coil 24 is substantially equal to the external diameter of the transmitter coil 22.

It should be understood that the receiver coil 24 could be independent from the transmitter coil 22 while still being concentric and coaxial with the transmitter coil 22. In this case, the internal diameter of the receiver coil 24 may be different from the external diameter of the transmitter coil 22.

Figure 2B:
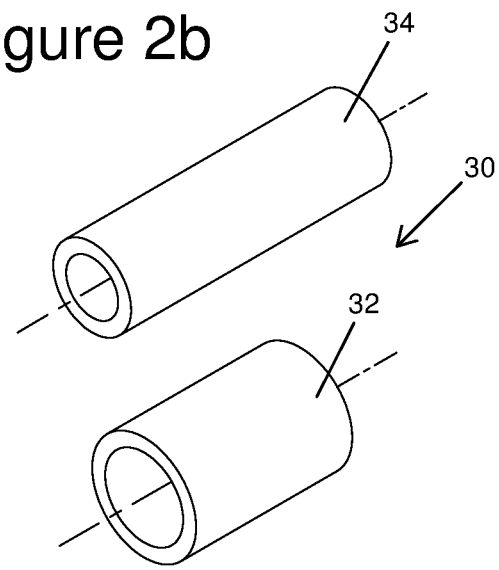
FIG. 2b illustrates a probe element comprising a receiver coil mounted spaced apart from a transmitter coil, in accordance with an embodiment.

FIG. 2*b* illustrates an exemplary probe element 30 which comprises a transmitter coil 32 and a receiver coil 34 which is positioned away from the transmitter coil 32 so that the transmitter and receiver coils 32 and 34 are not in physical contact. In the illustrated embodiment, the longitudinal axis of the transmitter coil 32 is parallel to that of the receiver coil 34. It should be understood that the distance between the transmitter and receiver coils 32 and 34 and the relative position between the transmitter and receiver coils 32 and 34 are chosen so that the receiver coil 34 may detect the eddy current generated by the transmitter coil 32. In one embodiment, the receiver coil 32 is to be positioned as close as possible from the surface to be inspected.

While in FIGS. 2*a* and 2*b*, it is shorter than the transmitter coil 22, 32, it should be understood that the receiver coil 24, 34 may have substantially the same length as the transmitter coil 22, 32 or be longer than the transmitter coil 22, 32.

In one embodiment, the diameter of the transmitter coil 22, 32 and the diameter of the receiver coil 24, 34 are chosen as a function of a desired measurement sensitivity, knowing that decreasing the diameter of the transmitter coil and/or the receiver coil increases the sensitivity.

Figure 3:
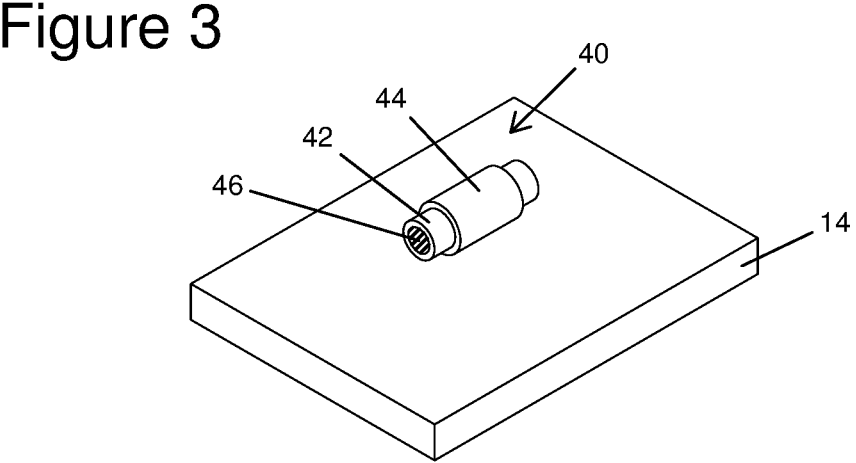
FIG. 3 illustrates a probe element comprising a transmitter coil mounted on a cylindrical core and a receiver coil mounted on the transmitter coil, in accordance with an embodiment.

FIG. 3 illustrates a further example of a probe element 40 which comprises a transmitter coil 42 and a receiver coil 44 mounted on the transmitter coil 42. The probe element 40 further comprises a cylindrical core 46 on which the transmitter coil 42 is assembled. The core 46 allows increasing the amplitude of the magnetic field generated by the transmitter coil 42.

In one embodiment, the core 46 is made of a material having a high magnetic permeability. In one embodiment, the material from which the core 46 is made further has a low electrical conductivity. In one embodiment the core 46 is made of ferrite or ferritic steel.

Figure 4:
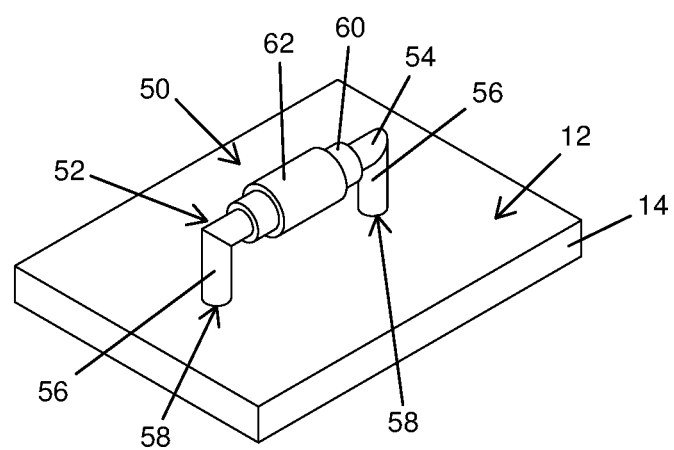
FIG. 4 illustrates a probe element comprising a transmitter coil mounted on a core having two legs and a receiver coil mounted on the transmitter coil, in accordance with an embodiment.

FIG. 4 illustrates one embodiment of a probe element 50 which comprises a core 52 such as a ferrite core or ferritic steel core. The core 52 comprises a central cylinder 54 and a pair of cylindrical legs 56 which each extends from the cylinder 54 at a respective end thereof. Each leg 56 is provided with a surface contacting end 58 which may be adapted to be positioned on the surface 12 of the material to be inspected 14. The probe element 50 further comprises a transmitter coil 60 assembled on the central cylinder 54 of the core 52, and a receiver coil 62 mounted on the transmitter coil 60. The legs 56 allows better guiding the magnetic field generated by the transmitter coil 60 and enhancing the magnetic coupling with the material to be inspected 14 with respect to the probe element 40 for example.

While they are cylindrical, it should be understood that the core 52 and the legs 56 illustrated in FIG. 4 may have different shape. For example, the legs 56 may have a square or rectangular cross-sectional shape.

Figure 5A:
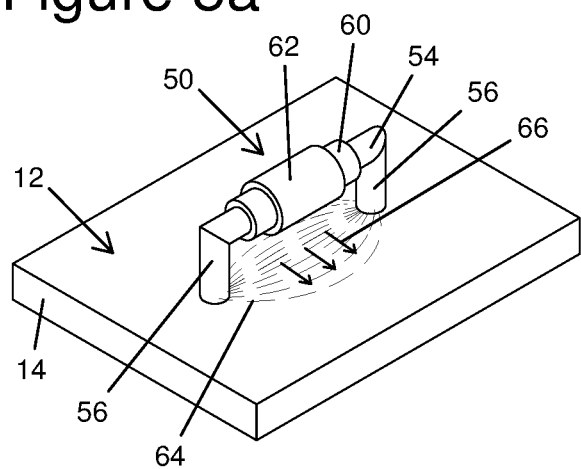
FIGS. 5a-5b illustrate the generation by the probe element of FIG. 4 of a magnetic field and an eddy current within a material to be inspected, in accordance with an embodiment.
Figure 5B:
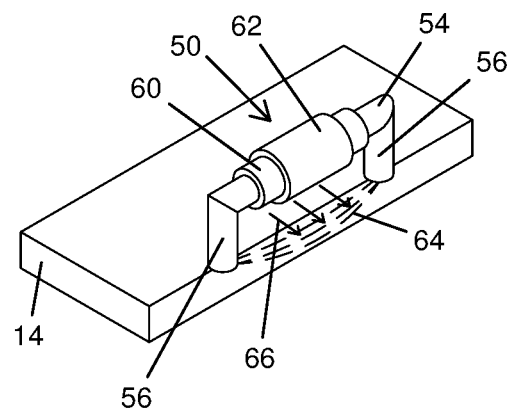

FIGS. 5*a*-5*b* illustrates the operation of the probe element 50. The probe element is positioned relative to the surface 12 of the material to be inspected 14 so that the ends 58 be adjacent to the surface 12. An AC current is propagated through the transmitter coil 60, and as a result of the AC current, a magnetic field 64 is generated between the legs 56 of the core 52. A portion of the generated magnetic field extends within the material 14, as illustrated in FIG. 5*b* which shows a cross-sectional view of the material 14.

The portion of the magnetic field 64 that extends within the material 14 generates an eddy current illustrated by arrows 66 within the material 14. The direction of the eddy current 66 is orthogonal to the magnetic field 64, and is therefore orthogonal to the longitudinal axis of the transmitter coil 60. It should be understood that the direction of the eddy current periodically changes from the direction illustrated by arrow 66 to an opposite direction as the flow of electric charge of the AC current periodically reverses direction. The eddy current 66 induces a magnetic field which in turn induces an electrical voltage within the receiver coil 62.

Figure 6:
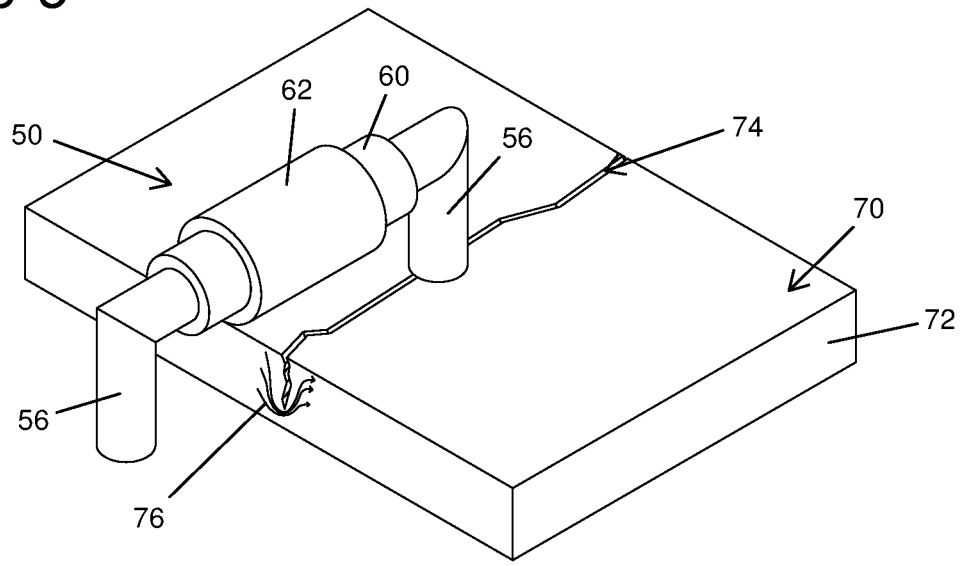
FIG. 6 illustrates the positioning of the probe element of FIG. 4 relative to a material having a surface-braking defect, in accordance with an embodiment.

FIG. 6 illustrates the detection of a defect by the probe element 50. The probe element is positioned adjacent to or in contact with a surface 70 of a material 72 to be inspected that comprises a longitudinal defect 74 such as a surface-breaking crack. The longitudinal defect extends at least partially along a longitudinal axis. The probe element 50 is positioned so that the axis between the legs 56 of the core 52 substantially corresponds to the longitudinal axis of the defect 74, i.e. the legs 56 are positioned so as to lie on the defect 74. In this case, the eddy current 76 generated by the transmitter coil 60 within the material 72 is substantially orthogonal to the defect 74 and the flow of eddy current 76 is modified by the defect 74. As a result, the induced voltage at the receiver coil 62 changes, and the presence and depth of the defect 74 can be detected from the variation of the induced voltage.

Figure 7:
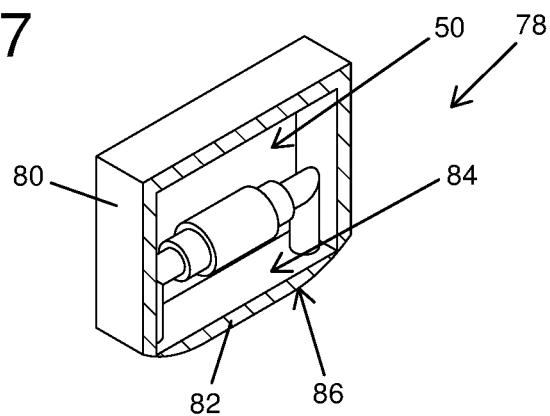
FIG. 7 illustrates the probe element of FIG. 4 encapsulated in a casing, in accordance with an embodiment.

FIG. 7 illustrates one embodiment of a probe assembly 78 that comprises a probe casing 80 adapted to protect the probe element 50 and in which the probe element 50 is packaged. The casing 80 comprises a surface contacting face 82 having an internal surface 84 and an external surface 86 adapted to be in physical contact with the surface of the material to be inspected. The probe element 50 is secured within the casing 80 so that the legs 56 of the core 52 be secured to the internal surface 84 of the surface contacting face 82. The external surface 86 of the surface contacting face 82 is curved so as to accommodate physical irregularities that may be present on the surface to be inspected.

It should be understood that the external surface 86 of the surface contacting face 82 may be provided with any other adequate shape. For example, the external surface 86 may be substantially planar. In another embodiment, the external surface 86 may comprise a planar central section sandwiched between beveled ends.

While the casing 80 has a rectangular cross-sectional shape, it should be understood that any other adequate shape may be used.

In one embodiment, at least the surface-contacting face 82 of the casing 80 is made of a flexible material in order to accommodate physical irregularities that may be present on the surface to be inspected.

Figure 8:
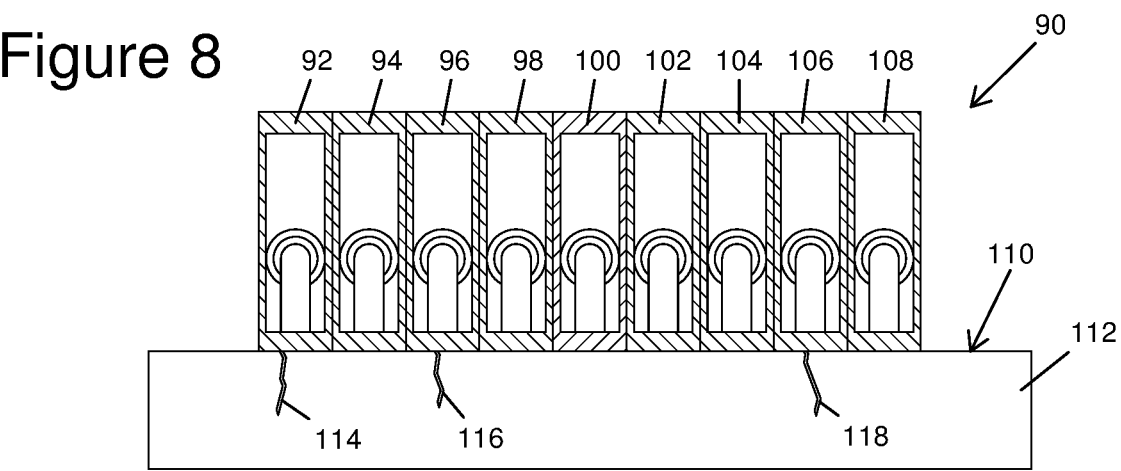
FIG. 8 illustrates an array probe comprising nine probe elements and positioned on a flat surface, in accordance with an embodiment.

FIG. 8 illustrates one embodiment of an array probe 90 that comprises nine probe assemblies 92-108 which may all correspond to the probe assembly 78. Each probe assembly 92-108 comprises a core provided with two legs, such as core 52, a transmitter coil, and a receiver coil. The probe assemblies 92-108 are arranged in a linear configuration, i.e. they are positioned side-by-side along a transversal axis which is parallel to the direction of the flow of the eddy currents generated by the transmitter coils and orthogonal to a scan direction, when the array probe 90 is in use. In this configuration, the axes between the legs of each probe element 92-108 are all parallel to each other so that the flows of eddy currents generated by the probe elements 92-108 are also all parallel to each other.

While the array probe 90 comprises nine probe assemblies, it should be understood that the number of probe elements or probe assemblies contained in an array probe may vary as long as the array probe comprises at least two probe elements or probe assemblies.

In FIG. 8, the array probe 90 is positioned on a surface 110 of a material to be inspected 112. The material 112 comprises three surface-breaking defects 114-118 and the array probe 90 is positioned so that the probe assemblies 92, 96, and 106 are positioned on top of the defects 114, 116, and 118, respectively. Therefore, the eddy currents flowing below the probe assemblies 92, 96, and 106 will be different from the eddy currents flowing below the probe assemblies 94, 98-102, and 106, which allows determining that a defect is present under the probe assemblies 92, 96, and 106.

The probe assemblies 92-108 are selectively operated over time, i.e. groups of at least one probe assemblies 92-108 are sequentially operated, as described in further detail below.

It should be understood that the number of probe assemblies may vary as along as the array probe comprises at least two probe assemblies. The relative positioning of the probe assemblies 92-108 may also vary. While in FIG. 8 the probe assemblies 92-108 are all parallel to generate parallel flows of eddy currents, it should be understood that other configuration may be possible. For example, an array probe may comprise two probe assemblies that are positioned at a 45 degrees angle so that the angle between the flows of generated eddy currents be 45 degrees.

Figure 9:
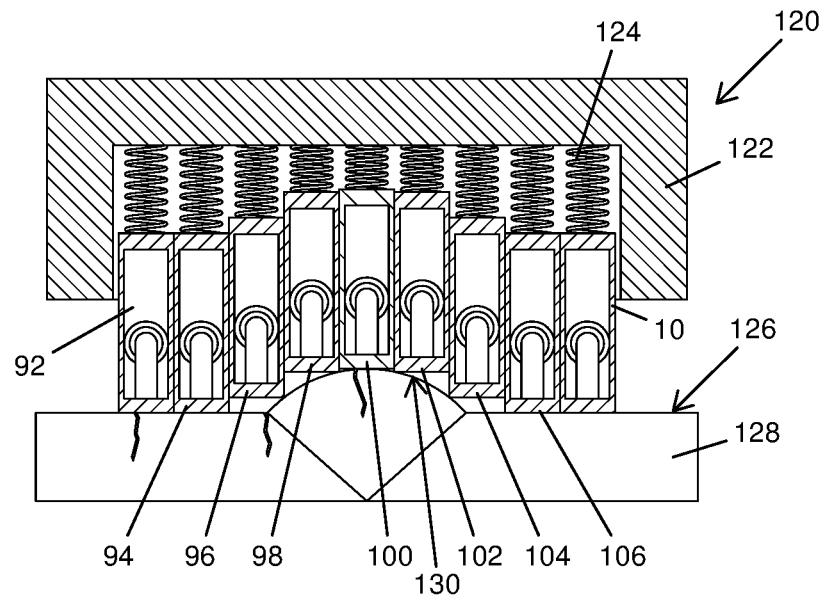
FIG. 9 illustrates an array probe comprising nine spring-loaded probe elements and positioned on an irregular surface, in accordance with an embodiment.

FIG. 9 illustrates one embodiment of a spring-loaded array probe 120 which comprises nine probe assemblies 92-108. The spring-loaded array probe 120 further comprises a frame 122 to which the probe assemblies 92-108 are each movably secured to the frame 122 via a respective spring 124 to accommodate variations of the surface 126 of a material to be inspected 128 and minimize the distance between the probe assemblies 92-108 and the surface to be inspected 126.

In the illustrated embodiment, the spring-loaded array probe 120 is positioned so that the probe assemblies 92, 94, 106, and 108 are in physical contact with the planar section of the surface to be inspected 126 while the probe assemblies 96-102 are in physical contact a weld crown 130 which forms a protrusion that extends from the surface 126. The spring connected to the probe assemblies 96-102 are compressed while the springs connected to the probe assemblies 92, 94, 106, and 108 are in an extension position.

It should be understood that any adequate device for spring-loading the probe assemblies 92-108 may be used. For example, the springs 124 may be replaced by memory foam.

Figure 10:
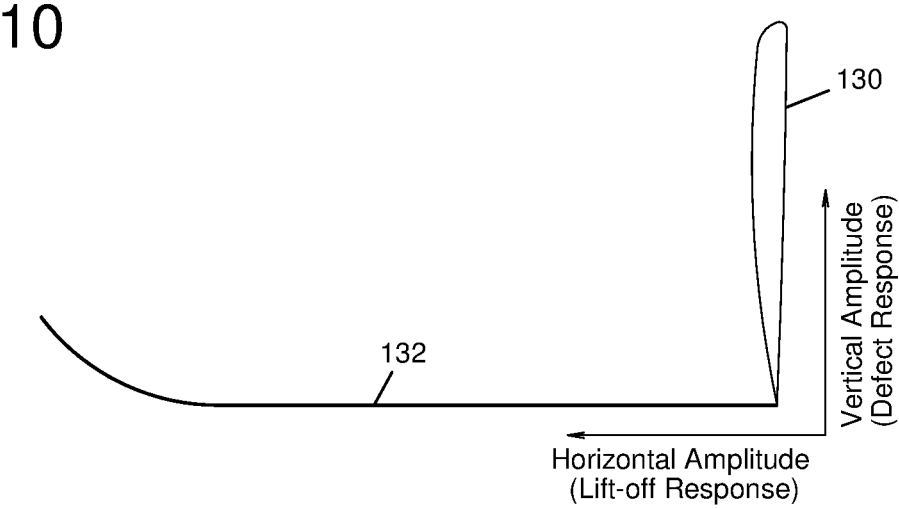
FIG. 10 illustrates a complex voltage plane representation comprising a single defect response, in accordance with an embodiment.

As described above, the voltage is measured at the terminals of the receiver coil of a probe element or a probe assembly. FIG. 10 illustrates the determined voltage when represented in a complex voltage plane. For a given excitation frequency, the positioning of the receiver coil relative to the eddy current induced by the transmitter coil, i.e. having the longitudinal axis of the receiver coil substantially orthogonal to the flow of eddy current and substantially parallel to the surface to be inspected, allows obtaining orthogonality between a defect response 130 indicative of the depth of a defect and the lift-off signal 132. This particular positioning of the receiver coil allows measuring independently and concurrently lift-off variations (along a horizontal axis) and amplitude variations originating from a defect response (along a vertical axis). Depending on characteristics such as the operation frequency, the dimensions of the transmitter/receiver, the materials of the transmitter and receiver, and/or the like, the angle between the defect response 130 and the lift-off response 132 within the complex voltage plane may vary from 90 degrees, while the defect and lift-off response may still be considered as being orthogonal for the purpose of the present description. For example, an angle of about 125 degrees may be formed between the defect and lift-off responses 130 and 132 and the defect and lift-off responses may still be considered as being orthogonal.

Figure 11:
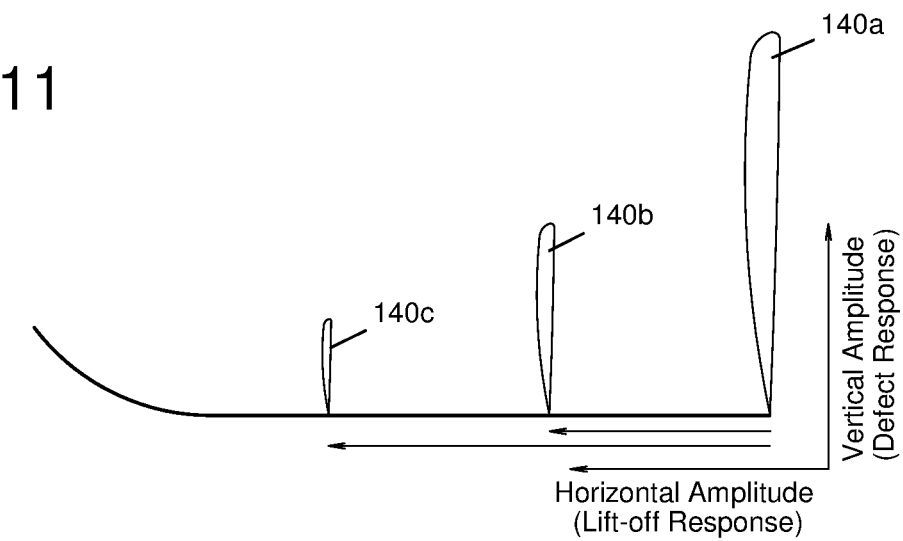
FIG. 11 illustrates a complex voltage plane representation comprising three same defect responses positioned at different lift-off positions, in accordance with an embodiment.

FIG. 11 illustrates the voltage variation caused by a same defect and represented in a complex voltage plane when the distance between the receiver coil and the surface to be inspected varies. As illustrated in FIG. 11, increasing the distance between the receiver coil and the surface to be inspected shifts the defect response towards greater values of lift-off response. For example, the defect response 140a corresponding to a zero lift-off response represents the case where the receiver coil is in physical contact with the surface to be inspected. If the distance between the receiver coil and the surface to be inspected is increased, e.g. if a 1 mm layer of coating or painting is located between the receiver coil and the surface, the defect response shifts toward a greater value of lift-off response, as illustrated by defect response 140b. If the distance between the receiver coil and the surface to be inspected is further increased, e.g. if a 2 mm layer of coating or painting is located between the receiver coil and the surface, the defect response shifts toward an even greater value of lift-off response, as illustrated by defect response 140*c*. It should also be noted that the maximal amplitude of the defect response decreases as the distance between the receiver coil and the surface to be inspected increases.

In one embodiment, using calibration, it is possible to compensate for the energy losses caused by lift-off between the probe and the surface by applying a predetermined compensation gain to the maximal amplitude of the defect response, and thereby determine the correct defect depth even if the defect is located below a layer of coating or painting for example.

Figure 12:
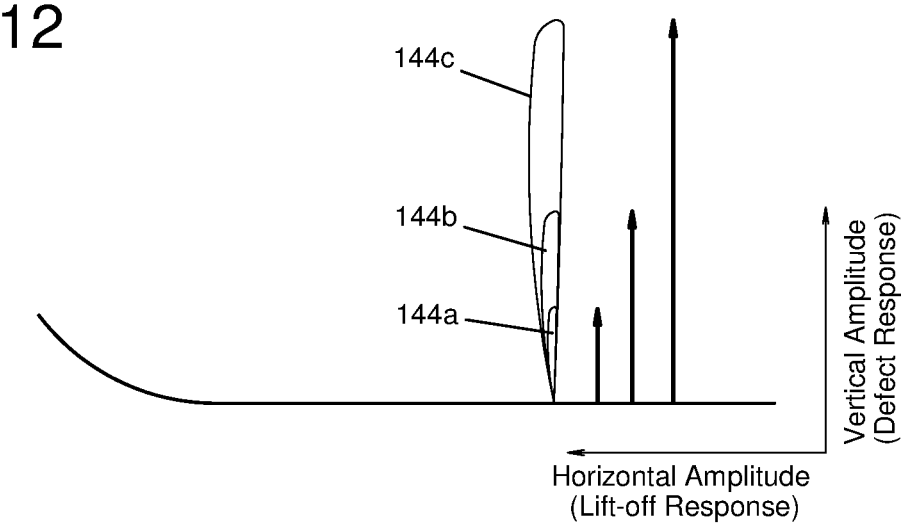
FIG. 12 illustrates a complex voltage plane representation comprising three different defect responses positioned at a same different lift-off position, in accordance with an embodiment.

FIG. 12 illustrates the voltage variation caused by different defects and represented in a complex voltage plane when the different defects have a different depth. As illustrated in FIG. 12 and for a same distance between the receiver coil and the surface to be inspected, increasing the depth of a defect increases the amplitude of the defect response. For example, the defect response 144*a* having a first maximal amplitude represents the case where the sensed defect has a first depth.

If the depth of the defect is increased up to a second depth which is greater than the first depth, the maximal amplitude of the defect increases up to a second maximal value, as illustrated by defect response 144*b*. If the depth of the defect is further increased up to a third depth which is greater than the second depth, the maximal amplitude of the defect increases up to a third maximal value, as illustrated by defect response 144*c*. The greater the depth of a defect is, the more the eddy current is deflected by the defect and the less energy is coupled into the receiver coil.

Figure 13:
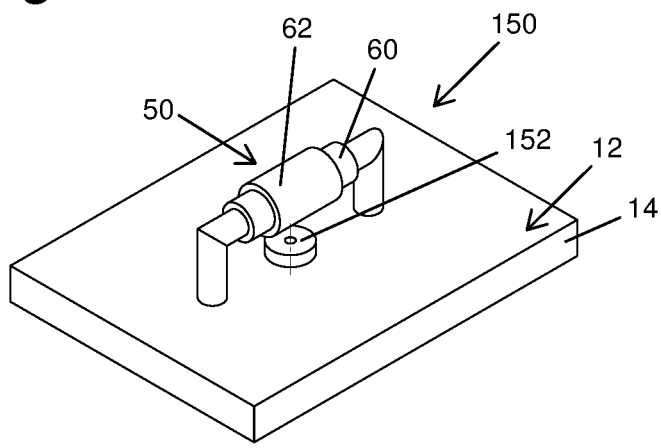
FIG. 13 illustrates a probe element comprising the probe element of FIG. 4 and a pancake coil, in accordance with an embodiment.

FIG. 13 illustrates a further example of a probe element 150 which comprises the probe element 50 and a further receiver coil 152 such as a pancake coil. The probe element 150 may be used for determining the length of a defect while the probe element 150 is moved along a defect present in the material 14. The receiver coil 152 extends along a longitudinal axis that is orthogonal to the longitudinal axis of the receiver coil 62 and also orthogonal to the surface 12 when the probe element 150 scans the surface 12.

While the receiver coil 62 is adapted to sense eddy currents that are deflected by the defect in a plane that is substantially orthogonal to the surface to be inspected 12 since the longitudinal axis of the receiver coil 62 is substantially orthogonal to the flow of eddy current and substantially parallel to the surface to be inspected 12, the receiver coil 152 is adapted to sense eddy currents that swirl around defect ends and are deflected in a plane that is substantially parallel to the surface to be inspected 12, as illustrated in FIG. 15*a*, since the longitudinal axis of the receiver coil 152 is substantially orthogonal to the surface to be inspected 12.

Figure 14A:
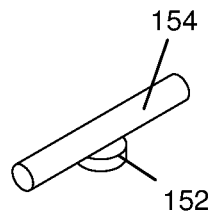
FIGS. 14a and 14b illustrate a transmitter coil and a pancake coil arranged in different relative positons, in accordance with an embodiment.
Figure 14B:
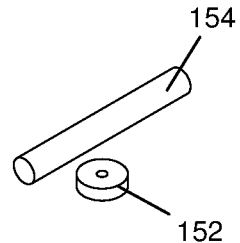

FIGS. 14*a* and 14*b* illustrate different relative positons between a transmitter coil 154 and a receiver coil 152. As illustrated in FIG. 14*a*, the receiver coil 152 may be in physical contact with the transmitter coil 154 as long as its longitudinal axis is orthogonal to the surface to be inspected and to the flow of induced eddy current. As illustrated in FIG. 14*b*, the receiver coil 152 may be independent from the transmitter coil 154 so that the two coils are not in physical contact together, as long as its longitudinal axis is orthogonal to the surface to be inspected and to the flow of induced eddy current.

FIG. 15*b* illustrates the probe element 150 at two different positons relative to a defect 160 extending longitudinally within a material to be inspected 162 between a first end 164 and a second end 166. The probe element 150 is positioned on the surface 168 of the material to be inspected 162 so that the longitudinal axes of the transmitter and receiver coils 60 and 62 are collinear with the longitudinal axis of the defect 160. The probe element 150 is moved on the surface 168 along a scan direction which is collinear with the longitudinal axis of the defect 160. As illustrated in FIG. 15*a* which shows the top view of the eddy current while the probe element 150 moves along the defect 160, the eddy current swirls and gets around each end 164 and 166 in a plane that is parallel to the surface 168 while is cut by the defect 160 or the eddy current propagates under the defect 160 between the two ends 164 and 166. A deflection of the eddy current induced by the transmitter coil 60 within a plane that is parallel to the surface 168 is detected by the receiver coil 152.

When no defect is present in the material, the voltage 170 of the receiver coil 152 is substantially constant, as illustrated in FIG. 15*c*. When the probe element 150 reaches the position 150*a*, the coil receiver 152 is located on top of the first end 164 of the defect 160 and the first end deflects the eddy current 176 within a plane parallel to the surface 168 according to a first direction, e.g. the anti-clockwise direction. The deflection of the eddy current 176 by the first end 164 of the defect 160 induces a variation of the voltage 170 which reaches a maximum 172. Once the receiver coil 152 has passed over the first end 162 of the defect 160, the eddy current 180 is cut by the defect 160 or propagates under the defect in a plane orthogonal to the surface 168 and the voltage 170 comes back to its initial value. When the probe element 150 reaches the position 150*b*, the coil receiver 152 is located on top of the second end 166 of the defect 160 and the second end 166 deflects the eddy current 178 within a plane parallel to the surface 168 according to a second direction, e.g. the clockwise direction. The deflection of the eddy current 178 by the second end 166 of the defect 160 induces a variation of the voltage 170 which reaches a minimum 172. The length L of the defect 160 can therefore be determined by measuring the distance covered by the receiver coil 152 or the probe element 150 between the detection of the voltage maximum 172 and the detection of the voltage minimum 174.

Figure 15:
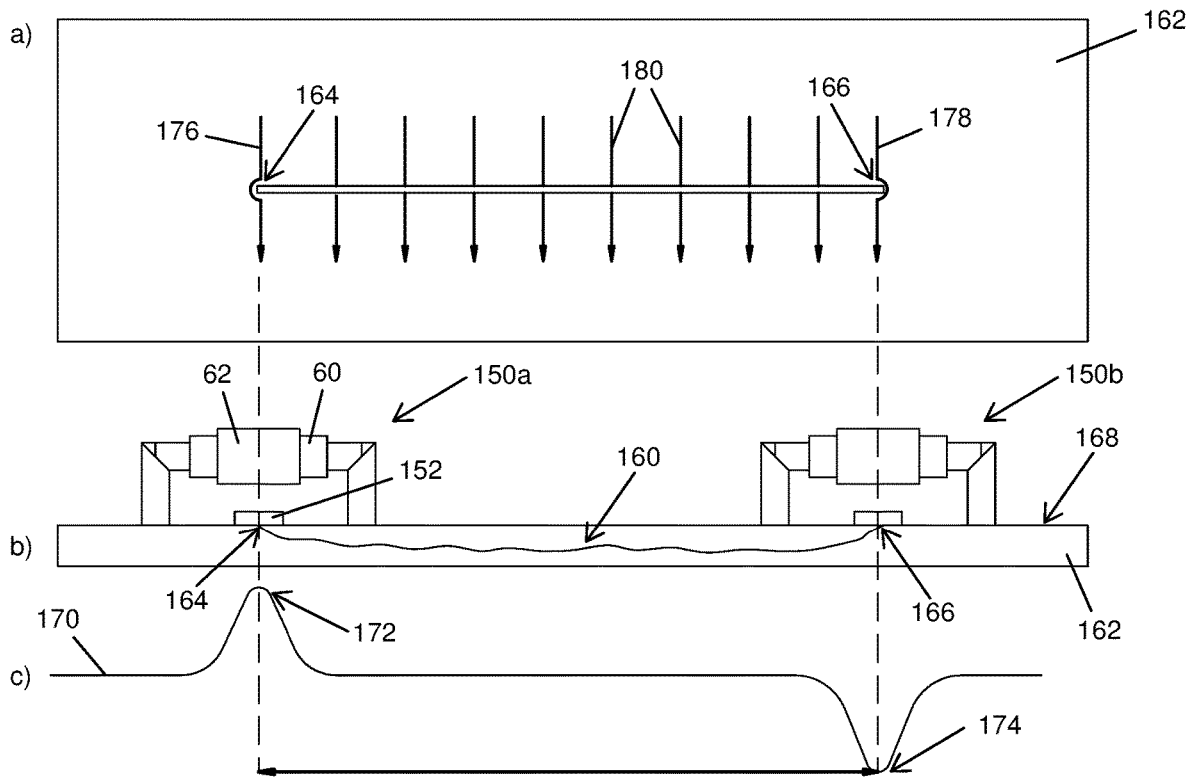
FIG. 15a is a top view of eddy current propagating in a material to be inspected provided with a surface-breaking defect, in accordance with an embodiment.
FIG. 15b illustrates the probe element of FIG. 13 positioned at the two ends of the surface-braking defect extending along the material of FIG. 15a, in accordance with an embodiment.
FIG. 15c illustrates the voltage response of the pancake coil of the probe element of FIG. 15b as a function of the position of the probe element along the material to be inspected, in accordance with an embodiment.

While in FIG. 15, the beginning 164 of the defect 160 corresponds to a voltage maximum 172 and the end 166 of the defect 160 corresponds to a voltage minimum 174, it should be understood that the contrary may be possible, i.e. a voltage minimum may correspond to the beginning of the defect 160 and a voltage maximum may correspond to the end of the defect.

Figure 16:
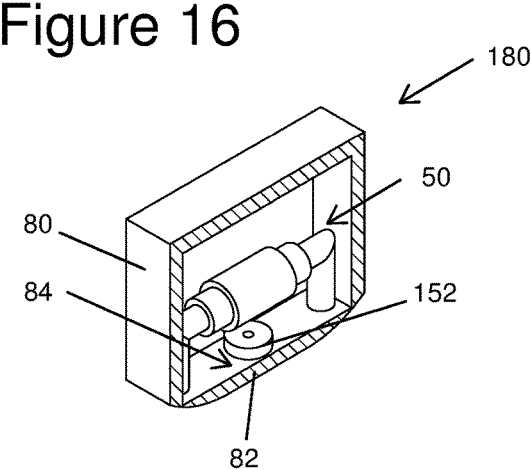
FIG. 16 illustrates the probe element of FIG. 13 encapsulated in a casing, in accordance with an embodiment.

FIG. 16 illustrates a probe assembly 180 which comprises the probe element 150 which includes the probe element 50 and the receiver coil 152. As for the coil assembly 78 illustrated in FIG. 7, the probe assembly 180 comprises a casing 80 in which the probe element 150 is packaged. The casing 80 comprises a surface contacting face 82 having an internal surface 84 and an external surface 86 adapted to be in physical contact with the surface of the material to be inspected. The probe element 50 is secured within the casing 80 so that the legs 56 of the core 52 be secured to the internal surface 84 of the surface contacting face 82. The receiver coil 152 is secured to the internal surface 84 of the surface contacting face 82 between the legs 56 of the core 52. The external surface 86 of the surface contacting face 82 is curved so as to accommodate physical irregularities that may be present on the surface to be inspected.

Figure 17:
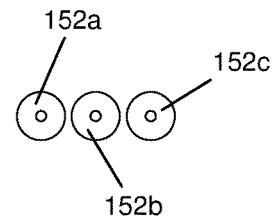
FIG. 17 illustrates three pancake coils arranged in a linear configuration, in accordance with an embodiment.

When an array probe comprises at least two probe elements 150 or probe assemblies 180, the receiver coils 152 may also be used for detecting transverse defects. FIG. 17 schematically illustrates three receiver coils 152a-152c such as three pancake coils which each belong to a respective probe element 150 or probe assembly 180. In one embodiment, the coil 152b is used as a transmitter for generating a magnetic field and at least one of its neighbor coils 152a and 152c is used as a receiver for detecting the eddy current induced by the coil 152b. Such a configuration is referred to as "short transmit-received" configuration. A transverse defect may then be detected from the voltage variation within the coil 152a and/or 152c. In another embodiment, the coil 152a is used as a transmitter for generating a magnetic field and its second neighbor coil which is not adjacent thereto, i.e. coil 152c, is used as a receiver for sensing the eddy current induced by the coil 152a. Such a configuration is referred to as a "long transmit-receive" configuration. A transverse defect may then be detected from the voltage variation within the coil 152c.

Figure 18A:
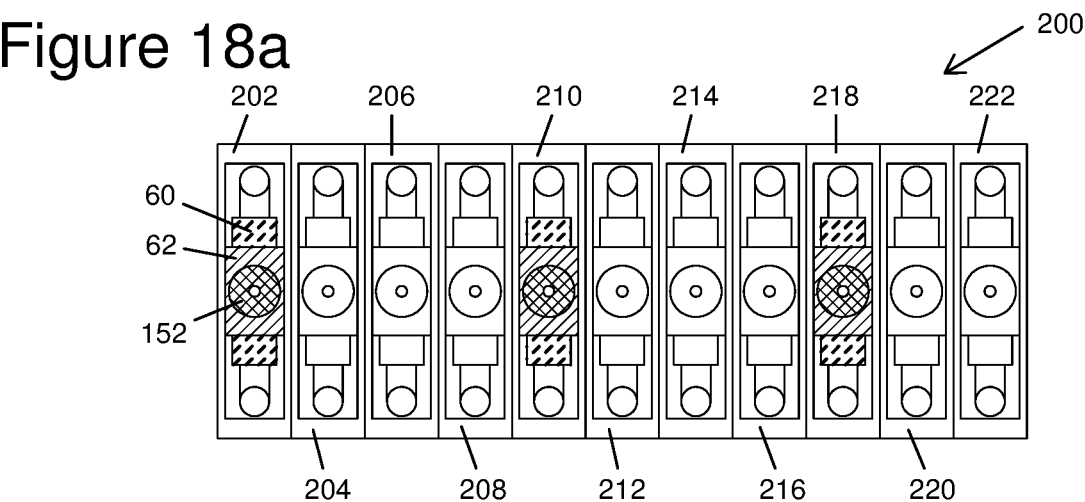
FIG. 18a illustrates an array probe comprising eleven probe elements of which the first, fifth, and ninth probe elements are active, in accordance with an embodiment.
Figure 18B:
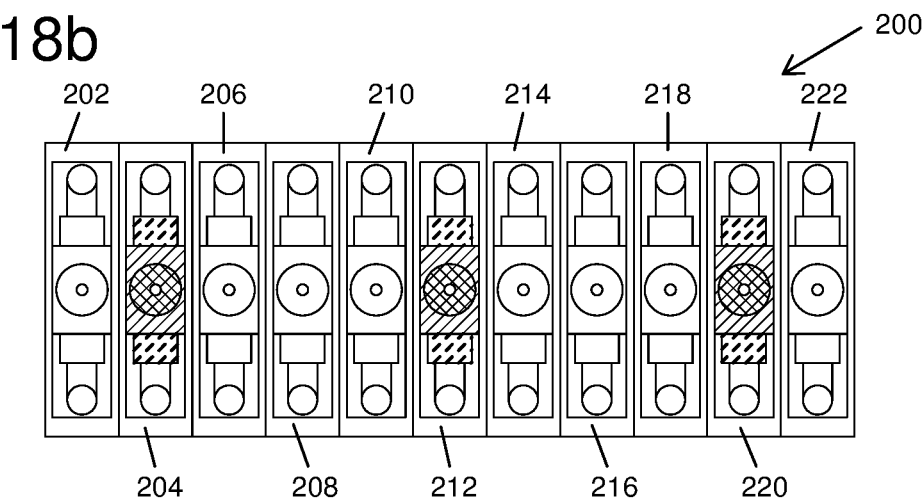
FIG. 18b illustrate the array probe of FIG. 18a of which the second, sixth, and tenth probe elements are active, in accordance with an embodiment.

FIGS. 18a and 18b illustrates an exemplary probe array 200 which comprises eleven probe assemblies 202-222. While in the illustrated embodiment, each probe assembly 202-222 corresponds to the probe assembly 180, it should be understood that each probe assembly 202-222 may each correspond to the probe assembly 78. It should also be understood that the number of probe elements or assemblies contained in the array probe 200 may vary as long as the array probe 200 comprises at least two probe elements 78 or 150 or probe assemblies 180. When the array probe 200 comprises at least one probe assembly 180, it should be understood that the receiver coil 152 may be omitted from the probe assembly 180.

When the array probe 200 is in operation or use, the probe elements or assemblies contained in the array probe 200 are selectively activated at different instances of time, i.e. the probe elements or assemblies are divided into active elements and inactive elements at each instance of time. An active element is defined as a probe element or probe assembly of which the respective transmitter coil is excited to generate a magnetic field and/or the receiver coil is used to detect an eddy current. An inactive element is defined as a probe element or assembly of which the transmitter coil is not excited, and therefore does not generate a magnetic field, and of which the receiver coil is not used to detect an eddy current.

Active elements and inactive elements vary in time, i.e. the identification of the active elements and the identification of the inactive elements change from one instance of time to another. In one embodiment, a given probe element or assembly that is active at a given time instance cannot be active at another time instance as long as all of the probe elements or assemblies have not been activated. In another embodiment, a given probe element or assembly that has been activated at a given instance of time can be activated at a subsequent instance of time even if not all of the other probe elements or assemblies have been activated between the given and subsequent instances of time.

In one embodiment, the probe elements or assemblies are activated according to an activation sequence. The activation sequence comprises a sequence of instances of time and a respective identification of active and inactive elements for each instance of time contained in the sequence of time instances. As a result, for a first instance of time, the probe elements or assemblies of a first group are activated while the other probe elements or assemblies are inactive. At a second instance of time that is spaced in time from the first instance of time, the probe elements or assemblies of a second group are activated while the other probe elements or assemblies are inactive, etc. It should be understood that at least one probe element or assembly may not be activated during an activation sequence. For example, while the array probe 200 comprises nine probe elements or assemblies, only seven of the probe elements or assemblies may be used to scan a surface to be inspected.

Once the activation sequence has been completed, the array probe may be moved relative to the surface to be inspected at a different positon relative to the surface along a scan direction. Once the array probe 200 has been positioned at the new position relative to the surface to be inspected, the probe elements or assemblies are activated according to the same activation sequence or another activation sequence.

It should be understood that each transmitter coil 60 contained in the array probe 200 is connected to an AC power source for propagating an electrical current therein and thereby generating a magnetic field. Similarly, each receiver coil 62 and/or 152 is connected to a voltage sensor for measuring the voltage between the terminals of the receiver coil 62, 152. It should be understood that a same power source may be used selectively activate the transmitter coils 60 and a same voltage sensor may be used to selectively measure the voltages at the receiver coils 62, 152. A controller is used to control the power source(s) and the voltage sensor(s) according to the activations sequence. In one embodiment, the controller comprises at least a processing unit, a storing unit, and a communication unit for sending control signals to the power source(s) and the voltage sensor(s). The activation sequence is stored in the storing unit. The processing unit is adapted to retrieve the activation sequence from the storing unit and control the probe elements or assemblies according to the retrieved activation sequence. Using the activation sequence, the processing unit identifies, for each instance of time, the probe elements or assemblies for which their respective transmission coil is to be activated and the probe elements or assemblies for which the voltage of the receiver coil is to be read. For each instance of time, the processing unit send, via the communication unit, an activation signal indicative of the identification of the transmission coils to be activated to the power source(s) and an activation signal indicative of the identification of the receiver coils for which the voltage is to be determined to the voltage sensor.

In an embodiment in which each transmitter coil is connected to a respective AC power source, the processing unit may send an activation signal to each power source connected to an identified transmitter coil. In this case, the power sources that receive an activation signal activates their respective transmitter coil. In an embodiment in which a single power is used to control all of the transmitter coils, the processing unit is adapted to send an activation signal that identifies the given transmitter coils to be activated. In this case, the power source only activates the transmitter coils that are identified in the received activation signal.

In an embodiment in which each receiver coil is connected to a respective voltage sensor, the processing unit may be adapted to send a respective activation signal to each voltage sensor connected to an identified receiver coil. In this case, each voltage sensor that receives an activation signal from the controller measures the voltage at the terminals of its respective receiver coil. In an embodiment in which a single voltage sensor is used for measuring the voltage of all of the receiver coils, the processing unit is adapted to send to the voltage sensor an activation signal that comprises an identification of the receiver coils for which the voltage is to be measured. In this case, the voltage sensor measures only the voltage of the identified receiver coils.

In one embodiment, the controller or an acquisition unit is adapted to receive voltage measurements from the voltage sensor(s) and store the received voltage measurement. The controller or acquisition unit may then identify the presence of a defect and determine the depth of the identified defect. The processing unit of the controller or acquisition unit is then adapted to receive the voltage values and determine the corresponding voltage of each corresponding AC operation frequencies. In one embodiment, the processing unit is adapted to create and store a complex voltage plane representation, and optionally display this representation on a display unit. In one embodiment, the processing unit is adapted to apply a compensation gain to the defect response of the complex voltage plane representation.

While the probe elements or assemblies contained in the array probe 200 are all parallel, i.e. the longitudinal axes of the transmitter coils of all of the probe elements or assemblies are all parallel, it should be understood that other configuration may be possible. For example, at least two probe elements or assemblies may have different orientations to detect defects extending along different longitudinal axes. For example, the transmitter coil of a first probe element or assembly may extends along a first longitudinal axis and the transmitter coil of a second probe element or assembly may extends along a second longitudinal axis which is not parallel to the first longitudinal axis.

Referring back to FIGS. 18*a* and 18*b*, the probe assemblies 202-222 are multiplexed using the following method in order to minimize mutual inductance between adjacent coils. At a first point in time, a first group of non-adjacent probe assemblies 202-222 is excited. For example, the first group may comprise the probe assemblies 202, 210, and 218 so that three inactive probe assemblies are present between two active or excited probe assemblies, as illustrated in FIG. 18*a*. The transmitter coils 60 of the probe assemblies 202, 210, and 218 are excited substantially concurrently to generate a respective magnetic field. The magnetic field generated by each probe assembly 202, 210, and 218 induces a respective eddy current which is detected by the respective receiver coil 62 of the probe assembly 202, 210, and 218. Once the receiver coils 62 have sensed the eddy currents, the probe assemblies 202, 210, and 218 are deactivated and a second group of non-adjacent probe assemblies 202-222 is excited or activated at a second instance of time. For example, the second group of non-adjacent probe assemblies may contain the first right neighbor of each probe assemblies 202, 210, and 218, i.e. probe assemblies 204, 212, and 220, as illustrated in FIG. 18*b*. The transmitter coils 60 of the probe assemblies 204, 212, and 220 are then excited substantially concurrently to generate a respective magnetic field. The magnetic field generated by each probe assembly 204, 212, and 220 induces a respective eddy current which is detected by the respective receiver coil 62 of the probe assembly 204, 212, and 220. Once the receiver coils 62 have sensed the eddy currents, the probe assemblies 204, 212, and 220 are deactivated. At a subsequent third instance of time, a third group of non-adjacent probe assemblies, e.g. probe assemblies 206, 214, and 222, is excited, etc. Once all of the probe assemblies 202-222 have been selectively excited, the array probe 200 is moved up to a second positon in a scan direction which is parallel to the longitudinal axes of the transmitter and receiver coils 60 and 62. Once the array probe has been moved to the second position, the first group of probe assemblies, the second group, the third group, etc. are selectively excited and measurements are performed. Then the array probe is moved to a third position along the scan direction and the probe assemblies are selectively excited according to the above-described group distribution, etc. It should be understood that several defects extending along substantially parallel axes may be scanned using the array probe 200.

In one embodiment, the displacement of the array probe 200 is performed in a stepwise manner. In another embodiment, the displacement of the array probe along the surface is continuous.

While in the present embodiment three inactive or non-excited probe assemblies are inserted between two following excited probe assemblies, it should be understood that other configurations may be possible as long as at least one non-excited probe assembly is located between two excited probe assemblies at each point in time. For example, two excited probe assemblies could be spaced apart by two non-excited probe assemblies. In one embodiment, the number of inactive probe assemblies positioned between two active assemblies is chosen so as to reduce or eliminate crosstalk between the active probe assemblies.

In one embodiment, the receiver coil 152 of each excited probe assembly 202-222 further detects its respective eddy current in order to measure the length of a longitudinal defect using the above-described method.

In one embodiment, selectively operating the probe assemblies 202-222 according the operation method illustrated in FIGS. 18*a* and 18*b* allows covering a large surface while minimizing parasitic signals that would come from adjacent coils rather than the material being inspected.

In one embodiment, multiplexing several relatively small probe assemblies allows obtaining an increased resolution compared to having a single, large transmitter for example.

Figure 19A:
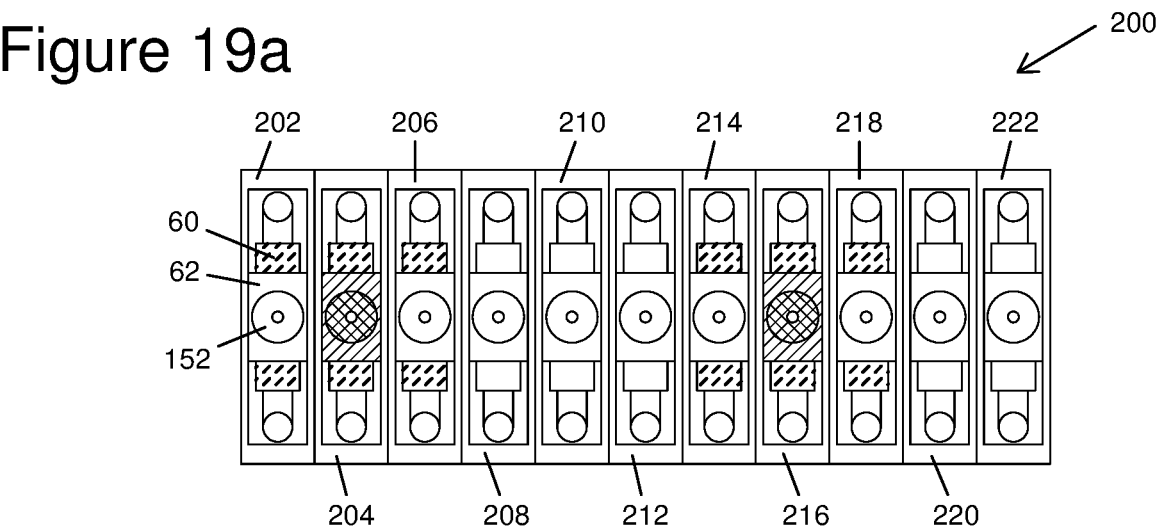
FIG. 19a illustrates the array probe of FIG. 18a in which the transmitter coil of the first, second, third, eight, ninth, and tenth probe elements is active and the receiver coils of the second and ninth probe elements are active, in accordance with an embodiment.
Figure 19B:
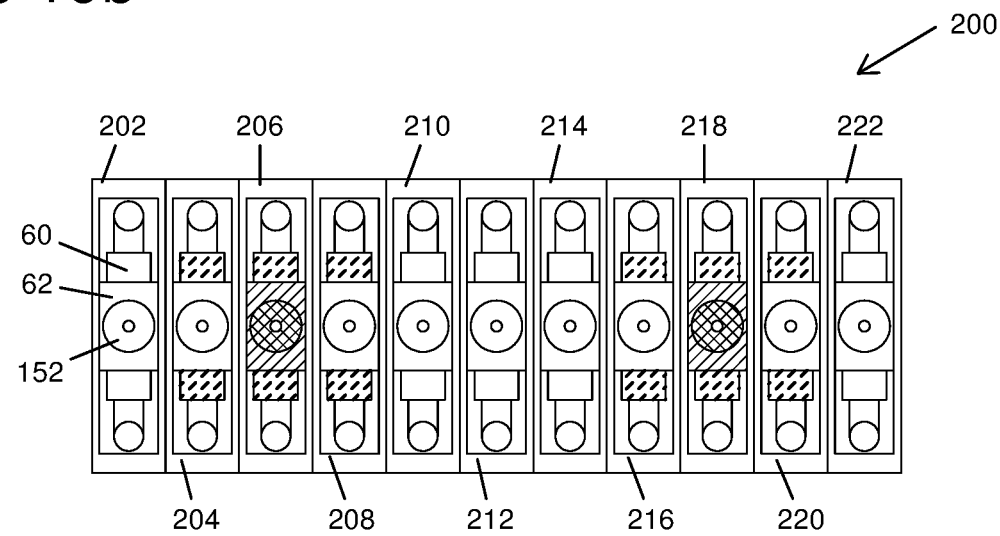
FIG. 19b illustrates the array probe of FIG. 18a in which the transmitter coil of the second, third, fourth, ninth, tenth, eleventh probe elements is active and the receiver coils of the third and tenth probe elements are active, in accordance with an embodiment.

While in the operation mode of the array probe 200 illustrated in FIGS. 18*a* and 18*b* the eddy currents are each generated by a single transmitter coil, it should be understood that at least two neighbor transmitter coils may be concurrently excited to generate an eddy current. The neighbor transmitter coils may be first neighbors, second neighbors, etc. FIGS. 19*a* and 19*b* illustrate an operation mode in which a single receiver coil 62 is used to detect the eddy currents generated by three probe assemblies.

In this mode of operation, a first group of probe assemblies 202-222 is excited at a first instance of time, i.e. the transmitter coils 60 of the probe assemblies contained in the first group are excited to each generate an eddy current while the remaining probe assemblies are not excited. In the illustrated embodiment, the first group comprises probe assemblies 202, 204, 206, 214, 216, and 218, which are divided into a first set containing probe assemblies 202, 204, and 206 and a second set containing probe assemblies 214, 216, and 218. The two sets of excited probe assemblies are spaced apart by at least one non-excited probe assembly. In the illustrated embodiment, three non-excited probe assemblies, i.e. probe assemblies 208, 210, and 212, are located between the two sets of excited probe assemblies.

At the first instance of time, the transmitter coils 60 of the first and second sets of probe assemblies are excited but only one receiver coil 62 per set of excited probe assemblies is used for sensing the eddy currents. In an embodiment in which a set of excited probe assemblies comprises an odd number of probe assemblies, only the receiver coil 62 of the central excited probe assembly may be used for sensing the eddy current. In the illustrated embodiment and respective to the first set of excited probe assemblies, only the receiver coil 62 of the probe assembly 204 is used for sensing the eddy currents generated by the probe assemblies 202, 204, and 206. Similarly and respective to the second set of excited probe assemblies, only the receiver coil 62 of the probe assembly 216 is used for sensing the eddy currents generated by the probe assemblies 214, 216, and 218.

At a second instance of time, a second group of probe assemblies is excited. For example, the probe assemblies of the second group may correspond to the probe assemblies of the first group shifted by one position towards to the right, i.e. the second group comprises probe assemblies 204, 206, 208, 216, 218, and 220. The second group comprises a first set of excited probe assemblies, i.e. probe assemblies 204-208, and a second set of excited probe assemblies, i.e. probe assemblies 216-220. For the first and second sets, only the receiver coil 62 of the central probe assembly, i.e. probe assembly 206 and 218 respectively, is used for sensing the induced eddy current. It should be understood that after exciting the second group at the second instance of time, a third group of probe assemblies is excited at a third instance of time, a fourth group of probe assemblies is excited at a fourth instance of time, etc.

Using the operation mode illustrated in FIGS. 19*a* and 19*b*, a larger magnetic field is generated in the material since a plurality of neighbor probe assemblies are concurrently excited. In the presence of an irregular surface to be inspected, such as a surface comprising a weld crown, concurrently exciting neighbor transmitter coils allows inducing a more uniform magnetic field (and thus a more uniform eddy current distribution) at the surface of the material being inspected when compared to a single large transmitter.

In one embodiment, the receiver coil 152 of the central probe assembly of each set may be used for sensing the eddy current and determine the length of a defect.

Figure 20A:
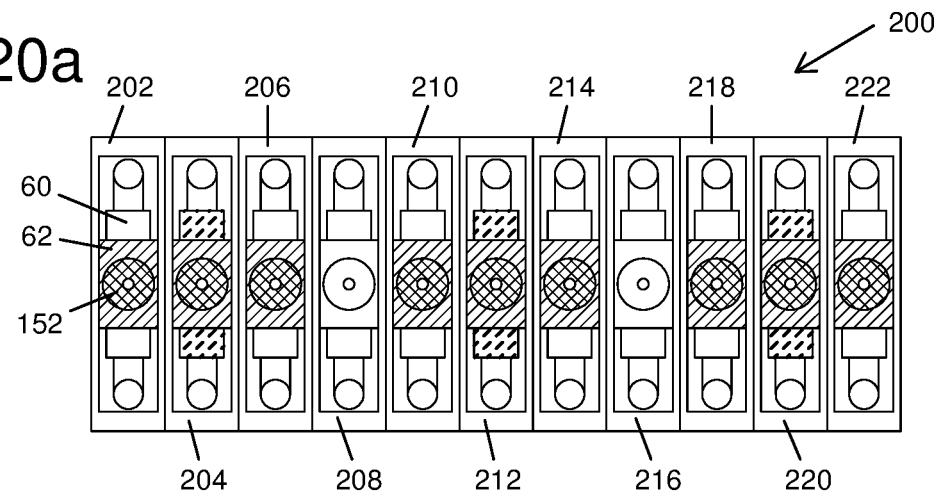
FIG. 20a illustrates the array probe of FIG. 18a in which the transmitter coil of the second, sixth, and tenth probe elements is active and the receiver coils of the first, second, third, fifth, sixth, seventh, ninth, tenth, and eleventh probe elements are active, in accordance with an embodiment.
Figure 20B:
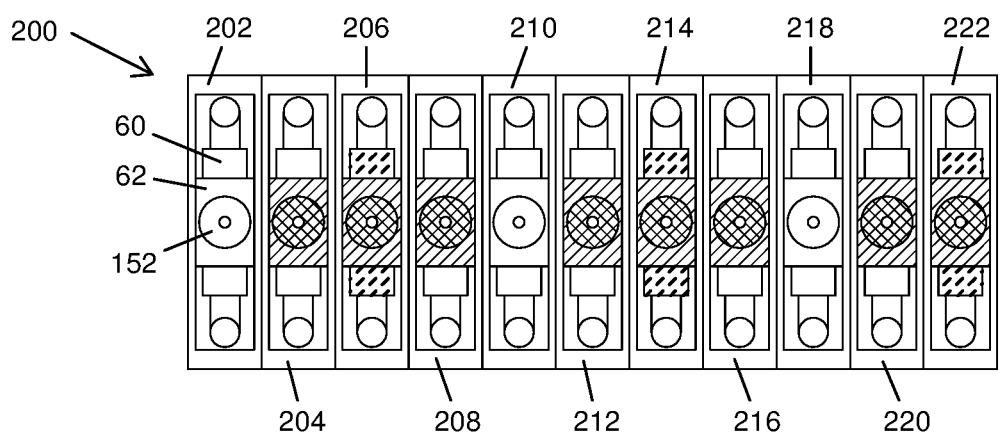
FIG. 20b illustrates the array probe of FIG. 18a in which the transmitter coil of the third, seventh, and eleventh probe elements is active and the receiver coils of the second, third, fourth, sixth, seventh, eighth, tenth, and eleventh probe elements are active, in accordance with an embodiment.

While in the operation mode of the array probe 200 illustrated in FIGS. 18*a* and 18*b* a single receiver coil is used for measuring the eddy current generated by an excited probe assembly, it should be understood that other configurations may be possible. For example, at least two adjacent or neighbor receiver coils may be used for sensing the eddy current induced within the material to be inspected by a single transmitter coil. FIGS. 20*a* and 20*b* illustrate an operation mode of the array sensor 200 in which three neighbor receiver coils 62 are used for sensing the eddy current induced by a single transmitter coil 60.

In this mode of operation, a first group of probe assemblies 202-222 is excited at a first instance of time, i.e. the receiver coils 62 of the probe assemblies contained in the first group are activated to each sense an eddy current while the remaining probe assemblies are not excited. In the illustrated embodiment, the first group comprises probe assemblies 202-206, 210-214, and 218-222, which are divided into a first set containing probe assemblies 202, 204, and 206, a second set containing probe assemblies 210, 212, and 214, and a third set comprising probe assemblies 218, 220, and 220. Two successive sets of excited probe assemblies are spaced apart by at least one non-excited probe assembly. In the illustrated embodiment, a single non-excited probe assembly, i.e. probe assemblies 208 and 216, is not excited between two sets of excited probe assemblies.

At a first instance of time and for each set of excited probe assemblies, the transmitter coil 60 of a single excited probe assembly is excited to generate an eddy current which is sensed by the receiver coil 62 of each excited probe assembly contained in the set. In an embodiment in which a set of excited probe assemblies comprises an odd number of probe assemblies, only the transmitter coil 60 of the central excited probe assembly may be used for inducing the eddy current within the material. In the illustrated embodiment and respective to the first set of excited probe assemblies, only the transmitter coil 60 of the probe assembly 204 is excited for inducing an eddy current which is sensed by the receiver coil 62 of the excited probe assemblies 202-206. Respective to the second set of excited probe assemblies, only the transmitter coil 60 of the probe assembly 212 is excited for generating an eddy current while the receiver coils 62 of the excited probe assemblies 210-214 are used for sensing the eddy current. Respective to the third set of excited probe assemblies, only the transmitter coil 60 of the probe assembly 220 is excited for generating an eddy current while the receiver coils of the excited probe assemblies 218-222 are used for sensing the eddy current.

At a second instance of time, a second group of probe assemblies is excited. For example, the probe assemblies of the second group may correspond to the probe assemblies of the first group shifted by one position towards to the right, i.e. the second group comprises probe assemblies 204-208, 212-216, and 220-222. It should be understood that the second group also comprises a further probe assembly which is adjacent to the probe assembly 222 and is not illustrated in FIG. 20*b*. The second group comprises a first set of excited probe assemblies, i.e. probe assemblies 204-208, a second set of excited probe assemblies, i.e. probe assemblies 212-216, and a third set of excited probe assemblies, i.e. probe assemblies 220 and 222 and the probe assembly which is adjacent to the probe 222 and does not appear on FIG. 20*b*. For each set, only the transmitter coil 60 of the central probe assembly, i.e. probe assembly 206, 214, and 222 is used for inducing an eddy current within the material while the receiver coil 62 of all of the probe assemblies contained within the set are used to sense the eddy current. For the third set, only the transmitter coil 60 of the excited probe assembly 222 is used for inducing an eddy current. It should be understood that after exciting the second group at the second instance of time, a third group of probe assemblies is excited at a third instance of time, a fourth group of probe assemblies is excited at a fourth instance of time, etc. It should be noted that the voltages measured at the receiver coils of a same set may be added together, at each instance of time In one embodiment, a probe may comprise at least two array probes 200. The relative position between the two array probes may vary. For example, the two array probes may be aligned along the scan direction, i.e. the two array probes are positioned side-by-side along the scan direction. In this case, the longitudinal axes of the transmitter coils of the two array probes 200 are all parallel to the scan direction, and the two array probes are positioned side-by-side along the scan direction. In a further example, the two array probes may be misaligned. In this case, the axes of the two array probes are not parallel and intersect one another at a given angle.

Figure 21:
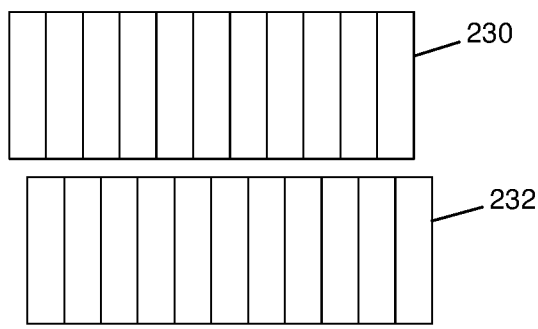
FIG. 21 illustrates two array probes being transversally shifted.

FIG. 21 illustrates two array probes 230 and 232 which are positioned side-by-side along the scan direction and transversally shifted. The array probe 230 is shifted to the left with respect to array probe 232 along a transversal axis, i.e. an axis orthogonal to the scan direction. Such a configuration allows a better precision since the probe assemblies of the array probe 232 will be able to detect any defect that could extend between two adjacent probe assemblies of the array probe 230. In this embodiment, the shift corresponds to half the width of a probe assembly. For example, if a probe would comprise three array probes, the shift between two array probes could be equal to one third of the width of a probe assembly.

In one embodiment, the probe further comprises a motion or position sensor for determining the positon of each probe element or assembly at each instance of time during the scan. Information such as the positon of a defect and/or the ends of a defect may then be obtained using the positon information provided by the motion or position sensor.

While the present description refers to a receiver coil for sensing an eddy current, it should be understood that any other adequate device adapted to detect an eddy current may be used. Examples of adequate devices comprise Hall effect sensors or magneto-resistance sensors such as Giant MagnetoResistive (GMR) sensors, Tunnel MagnetoResistive (TMR) sensors, Colossal MagnetoResistive (CMR) sensors, Anisotropic MagnetoResistive sensors, or the like.

Figure 22:
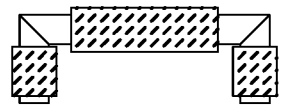
FIG. 22 illustrates a core comprising a central cylindrical section having a first transmitter coil mounted thereto, a first leg extending from a first end of the central section and having a second transmitter coil mounted thereto, and a second leg extending from a second end of the central section and having a third transmitter coil mounted thereto, in accordance with an embodiment.
Figure 23:
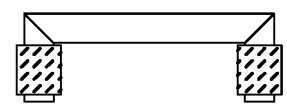
FIG. 23 illustrates a core comprising a central cylindrical section, a first leg extending from a first end of the central section and having a first transmitter coil mounted thereto, and a second leg extending from a second end of the central section and having a second transmitter coil mounted thereto, in accordance with an embodiment.

It should be understood that some of the characteristics of the above-described probe element or assembly may be varied. For example, while it comprises a single transmitter coil, it should be understood that the above-described probe element may comprise at least two transmitter coils, as illustrated in FIG. 22. In this case, the central section of the core is provided with a first transmitter coil while each leg of the core is also provided with a respective transmitter coil. The three transmitter coils cooperate to generate a magnetic field between the legs of the core. It should be understood that no transmitter coil may be mounted on the central section of the core, as illustrated in FIG. 23. In this case, the probe assembly comprises two transmitter coils each mounted on a respective leg of the core for generating a magnetic field between the two legs.

Figure 24:
FIG. 24 illustrates a curved core having a single transmitter coil mounted thereto, in accordance with an embodiment.
Figure 25:
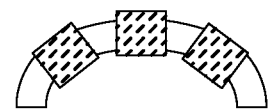
FIG. 25 illustrates a curved core having three transmitter coils mounted thereto, in accordance with an embodiment.

While the above-described core 52 is provided with two legs extending substantially orthogonally from a central section, it should be understood that other shape for the core may be possible. For example, a curved tubular core may be used to receive a transmitter coil thereon as illustrated in FIG. 24. It should be understood that more than one transmitter coil may be mounted on a curved core.

Figure 26:
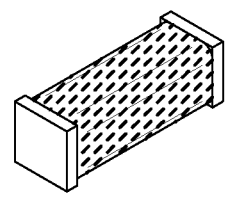
FIG. 26 illustrates a prism having a single transmitter coil mounted thereto, in accordance with an embodiment.
Figure 27:
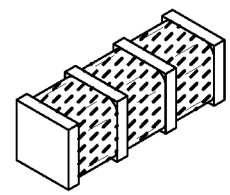
FIG. 27 illustrates a prism having three transmitter coils mounted thereto, in accordance with an embodiment.

While the above description refers to the use of a magnetic core on which at least one transmitter coil is mounted, it should be understood that a non-magnetic core may also be used. FIG. 26 illustrates a non-magnetic prism on which a single transmitter coil is mounted while FIG. 27 illustrates a non-magnetic prism on which three transmitter coils are mounted.

Figure 28:
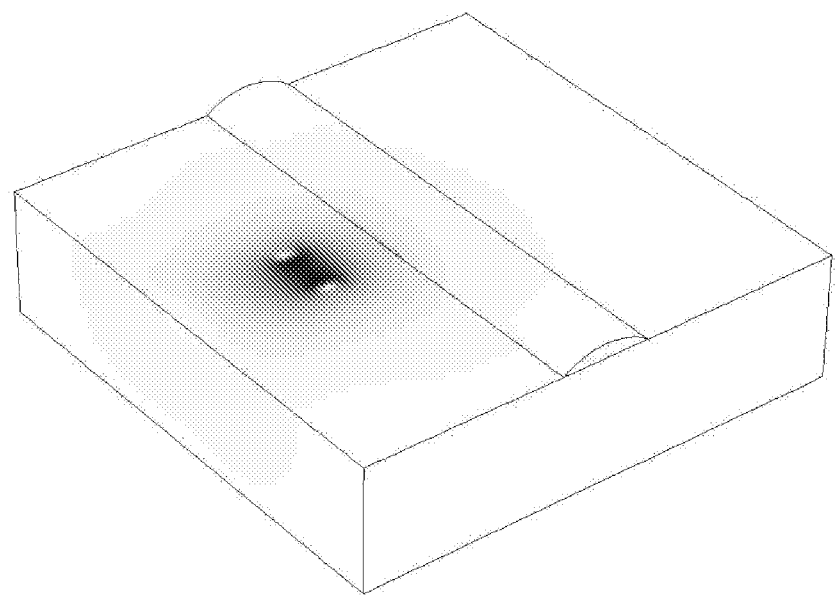
FIG. 28 illustrates a distribution of eddy current density obtained within a material when a single probe element is used to generate a magnetic field, in accordance with an embodiment.
Figure 29:
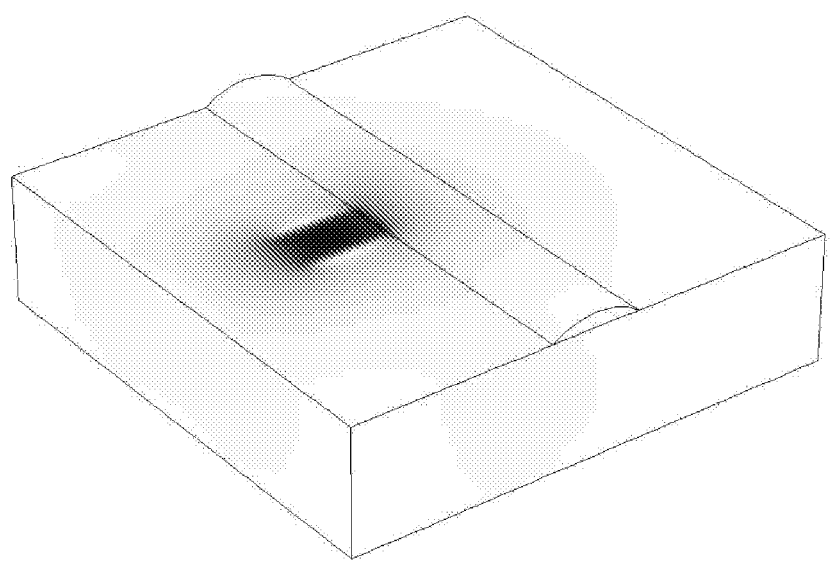
FIG. 29 illustrates a distribution of eddy current density obtained within a material when an array probe comprising three probe elements is used to generate a magnetic field, in accordance with an embodiment.

FIG. 28 illustrates the distribution of eddy current density when a single probe element 50 is used to generate a magnetic field within a material to be inspected. FIG. 29 illustrates the distribution of eddy current density when an array probe comprising three probe elements 50 is used to generate a magnetic field within the material. Increasing the number of probe elements allow to create a larger magnetic field within the material.

FIG. 30 (prior art) shows the eddy current density distribution as induced by a single, large transmitter in a material to be inspected. In the presence of an irregular surface, such as a weld crown, the field density is higher in portions of the surface that are closer to the transmitter, like the weld crown in this case, and lower in the heat-affected zone where cracks may be located, thus decreasing the defect detection performance.

FIG. 31 illustrates the distribution of eddy current density when an array probe comprising five probe elements 50 is used to generate a magnetic field within the same material as the one of FIG. 30. The eddy current induced by the array probe of FIG. 31 is more focalized with respect to that of FIG. 30.

As will be readily understood, although the example embodiments have been described in relation to a probe body with a planar configuration of coil elements, one will readily understand that the linear configuration of coil elements on one or more transversal rows of coil elements can be provided in a non-planar arrangement.

For example, should a cylindrical or semi-cylindrical probe body be needed for the inspection of a material, for example in the case of the inspection of a tube, the linear configuration of coil elements can be arranged to follow the curved outer surface of the probe body, the linear configuration of coil elements forming a curved ribbon or annulus (which may be partial). The curvature and/or general shape of the surface created by the coil elements placed side-by-side need not be regular, symmetrical or planar. The height of each coil element with respect to its neighboring elements may vary, even if they are identical.

In one embodiment, the above-described eddy current array probe is capable of detecting longitudinal and transverse surface-breaking defects in metallic objects. It allows for determining the depth and/or length of longitudinal surface-breaking defects. The detection and sizing capabilities are possible even in the presence of non-conductive coating on the surface being inspected. The probe features several independent coil configurations such that, at a given frequency, orthogonality exists between a defect response and the lift-off response. This coil arrangement allows measuring independently and simultaneously lift-off variations (along a horizontal axis) and amplitude variations originating from a defect response (along a vertical axis). In one embodiment, a variable number of transmitters can be excited simultaneously to induce magnetic fields with varying extent in the material being inspected. Such magnetic fields are generating eddy current distributions in the material being inspected. It is possible to adjust the density of the eddy currents to accommodate for specific geometric circumstances by exciting a certain number of transmitters in the probe. The present probe can induce uniform eddy current distributions even in irregular geometries, such as weld crowns. The intensity and distribution of eddy currents induced by a probe can be adjusted to suit many different geometric conditions and provide an adjustable sensitivity to surface-breaking defects.

EXAMPLE

In an example embodiment, an Eddy Current Array Probe for Carbon Steel Weld Inspection is provided. The probe leverages the power of eddy current array (ECA) technology to ascertain the length and depth of surface-breaking cracks in carbon steel welds without any surface preparation. Unlike traditional methods such as magnetic particle testing (MT) and penetrant testing (PT), the present array probe eliminates the need to strip off paint and coating over joints. The present array probe can tolerate a lift-off of up to 3 mm (0.120 in.). The width of the probe enables its spring-loaded "fingers" to adapt to the weld crown so that it can scan the complete weld cap, toe area, and heat-affected zone in a single pass with high, uniform sensitivity all the while sizing cracks as deep as about 10 mm.

Ferrous materials have always been a challenge for eddy currents. In one embodiment, the present array probe leads to a whole range of probes, for various weld configurations and defect sizes, capable of addressing at least some needs of many industries relying heavily on carbon steel.

In one embodiment, the present array probe allows increasing scanning speed. For example, welds may be examined up to 10 times faster compared to existing electromagnetic methods. In one embodiment, the use of the present array probe yields a wealth of information through 2D and 3D C-scans. This imaging offers intuitive and visual indications of defects, giving an operator confidence in his inspection results.

While in the above description, each probe element comprises at least one transmitter for inducing an eddy current within a material to be inspected and at least one receiver for sensing the induced eddy current, it should be understood that a single coil may be used to both generate the magnetic field and sense the eddy current. The longitudinal axis of the single coil is then parallel to the surface of the material to be inspected and orthogonal to the induced eddy current.

The embodiments of the invention described above are intended to be exemplary only. The scope of the invention is therefore intended to be limited solely by the scope of the appended claims.

The invention claimed is:

1. An eddy current array probe for detection and depth sizing of a surface-breaking defect in a metallic material, said eddy current array probe comprising:
   a probe body comprising a plurality of probe elements arranged in a linear configuration, the probe elements each comprising at least one coil, the probe body being adapted to be displaced along a surface of the metallic material so that a longitudinal axis of each of the at least one coil of each probe element is parallel to the surface of the metallic material, and each of the at least one coil of each probe element, when in use, being adapted to induce an eddy current within the metallic material and detect the eddy current; and
   a set of active elements of the plurality of probe elements being adapted to be selectively operated at a plurality of time-spaced instances.

2. The eddy current array probe of claim 1, wherein the at least one coil comprises a transmitter coil and a receiver, the transmitter coil, when in use, being adapted to induce an eddy current within the metallic material, and a longitudinal axis of the receiver being substantially orthogonal to the eddy current and substantially parallel to the surface of the metallic material so as to allow the receiver to detect the eddy current.

3. The eddy current array probe of claim 2, wherein, for each active element, at least one of the respective transmitter coil is activated to generate the magnetic field and the respective receiver is activated to detect the eddy current.

4. The eddy current array probe of claim 2, wherein, at each one of the time-spaced instances, two following ones of said active elements are spaced apart by at least one inactive element of said plurality of probe elements.

5. The eddy current array probe of claim 2, wherein the set of active elements comprises at least one group of at least three adjacent probe elements contained within the plurality of probe elements, the transmitter coil of each one of the at least three adjacent probe elements being activated and the receiver of a central one of at least the three adjacent probes being activated.

6. The eddy current array probe of claim 5, wherein the set of active elements comprises at least two groups of at least three adjacent probes, the at least two groups being spaced apart by at least one inactive probe element of said plurality of probe elements.

7. The eddy current array probe of claim 2, wherein the set of active elements comprises at least one group of at least three adjacent probes contained within the plurality of probe elements, the receiver of each one of the at least three adjacent probes being activated and the transmitter coil of a central one of at least the three adjacent probes being activated.

8. The eddy current array probe of claim 7, wherein the set of active elements comprises at least two groups of at least three adjacent probes, the at least two groups being spaced apart by at least one inactive probe element of said plurality of probe elements.

9. The eddy current array probe of claim 8, further comprising a frame and a plurality of springs each having a first end secured to the frame and a second frame secured to a respective one of the probe elements.

10. The eddy current array probe of claim 2, wherein the receiver comprises a receiver coil.

11. The eddy current array probe of claim 2, wherein the receiver comprises one of a Hall effect sensor and a magnetoresistance sensor.

12. The eddy current array probe of claim 2, wherein a longitudinal axis of the transmitter coil is parallel to the longitudinal axis of the receiver.

13. The eddy current array probe of claim 12, wherein the transmitter coil and the receiver are concentric.

14. The eddy current array probe of claim 13, wherein the probe elements each further comprise a core extending between two ends, the transmitter coil being mounted on the core and the magnetic field being generated between the two ends of the core.

15. The eddy current array probe of claim 14, wherein the core further comprises two legs each extending from a respective one of the two ends for guiding the magnetic field towards the surface of the metallic material.

16. The eddy current array probe of claim 14, wherein the receiver is mounted on the transmitter coil.

17. The eddy current array probe of claim 14, wherein the probe elements each further comprise a sensing coil for detecting an end of the surface-breaking defect, a longitudinal axis of the sensing coil being orthogonal to the eddy current and the surface of the metallic material.

18. The eddy current array probe of claim 1, wherein each one of the probe elements is encapsulated in a respective casing having a surface-contacting face adapted to contact the surface of the metallic material.

19. The eddy current array probe of claim 1, wherein each one of the probe elements is adapted to move independently towards and away from the surface to accommodate for geometry variations of the surface of the material.

20. A method for scanning a surface of a metallic material, comprising:
   providing an eddy current array probe comprising:
   a probe body comprising a plurality of probe elements arranged in a linear configuration, the probe elements each comprising at least one coil, the probe body being adapted to be displaced along a surface of the metallic material so that a longitudinal axis of each of the at least one coil of each probe element is parallel to the surface of the metallic material, and each of the at least one coil of each probe element, when in use, being adapted to induce an eddy current within the metallic material and detect the eddy current; and
   a set of active elements of the plurality of probe elements being adapted to be selectively operated at a plurality of time-spaced instances;

positioning the eddy current array probe on the surface at a first position wherein the longitudinal axis of each of the at least one coil of each probe element is parallel to the surface of the metallic material in the first position;

selectively activating the active elements at the plurality of time-spaced instances according to a first activation sequence, thereby generating and measuring a first plurality of eddy currents within the metallic material;

moving the eddy current array probe to a second and different position wherein the longitudinal axis of each of the at least one coil of each probe element is parallel to the surface of the metallic material in the second position; and selectively activating the active elements at the plurality of time-spaced instances according to a second activation sequence, thereby generating and measuring a second plurality of eddy currents within the metallic material.

21. The method of claim 20, wherein the first and second activation sequences are identical.

22. The method of claim 20, wherein said selectively activating comprises sequentially activating groups of probe elements at different ones of the time-spaced instances, each group of probe elements comprising at least one probe element for which the transmitter coil is activated and the receiver is activated, an identification of the at least one probe element varying from one of the time-spaced instances to another one of the time-spaced instances.

23. The method of claim 22, wherein the at least one probe element comprises at least two probe elements, two following ones of the at least two probe elements being spaced apart by an inactive probe element at each one of the time-spaced instances.

24. The method of claim 20, wherein said selectively activating comprises sequentially activating groups of probe elements at different ones of the time-spaced instances, each group of probe elements comprising at least one set of at least three adjacent probes, the receiver of each one of the at least three adjacent probes being activated and the transmitter coil of a central one of at least the three adjacent probes being activated concurrently with the activation of the receiver.

25. The method of claim 24, wherein the at least one set of at least three adjacent probe elements comprises a first set of at least three probe elements and a second set of at least three probe elements, the first and second sets being spaced apart by at least one inactive probe element at each one of the time-spaced instances.

26. The method of claim 20, wherein said selectively activating comprises sequentially activating groups of probe elements at different ones of the time-spaced instances, each group of probe elements comprising at least one set of at least three adjacent probes, the transmitter coil of each one of the at least three adjacent probes being activated and the receiver of a central one of at least the three adjacent probes being activated concurrently with the activation of the receiver.

27. The method of claim 26, wherein the at least one set of at least three adjacent probe elements comprises a first set of at least three probe elements and a second set of at least three probe elements, the first and second sets being spaced apart by at least one inactive probe element at each one of the time-spaced instances.

28. The method of claim 20, wherein said metallic material comprises anon-metallic surface coating.

29. The method of claim 20, wherein said moving is performed substantially continuously.

\* \* \* \* \*